(12) United States Patent
Igasaki et al.

(10) Patent No.: US 10,908,398 B2
(45) Date of Patent: Feb. 2, 2021

(54) VARIABLE FOCAL LENGTH LENS DEVICE AND VARIABLE FOCAL LENGTH LENS CONTROL METHOD

(71) Applicant: MITUTOYO CORPORATION, Kanagawa (JP)

(72) Inventors: Shiro Igasaki, Kanagawa (JP); Nobuo Ohba, Kanagawa (JP); Yuki Kurahashi, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 356 days.

(21) Appl. No.: 15/947,088

(22) Filed: Apr. 6, 2018

(65) Prior Publication Data

US 2018/0314041 A1 Nov. 1, 2018

(30) Foreign Application Priority Data

Apr. 28, 2017 (JP) .................................. 2017-089576

(51) Int. Cl.
| | |
|---|---|
| *G02B 15/14* | (2006.01) |
| *G02B 7/04* | (2006.01) |
| *G02B 3/14* | (2006.01) |
| *G02B 7/28* | (2006.01) |
| *G02B 7/08* | (2006.01) |
| *H04N 5/225* | (2006.01) |

(52) U.S. Cl.
CPC ............... *G02B 15/14* (2013.01); *G02B 3/14* (2013.01); *G02B 7/04* (2013.01); *G02B 7/08* (2013.01); *G02B 7/28* (2013.01); *H04N 5/2254* (2013.01)

(58) Field of Classification Search
CPC ...................................................... G02B 15/14
USPC ......................................................... 359/676
See application file for complete search history.

(56) References Cited

U.S. PATENT DOCUMENTS

| | | | |
|---|---|---|---|
| 9,961,253 B2* | 5/2018 | Bryll ................... | H04N 5/23216 |
| 2010/0177376 A1 | 7/2010 | Arnold et al. | |
| 2017/0013185 A1* | 1/2017 | Gladnick ............ | H04N 5/23296 |
| 2017/0285318 A1 | 10/2017 | Cho et al. | |

OTHER PUBLICATIONS

U.S. Appl. No. 15/947,144 to Shiro Igasaki et al., filed Apr. 6, 2018.
U.S. Appl. No. 15/951,599 to Hiroshi Sakai et al., filed Apr. 12, 2018.
U.S. Appl. No. 15/854,251 to Tatsuya Nagahama et al., filed Dec. 26, 2017.

* cited by examiner

*Primary Examiner* — James C. Jones
(74) *Attorney, Agent, or Firm* — Greenblum & Bernstein, P.L.C.

(57) ABSTRACT

A variable focal length lens device includes: a lens system whose refractive index changes in accordance with an inputted drive signal; and a resonance-lock controller that locks the drive signal to a resonance frequency of the lens system. The resonance-lock controller tunes a frequency of the drive signal to a peak position of a voltage-current phase difference between a voltage of the drive signal and a drive current of the lens system, and raises or lowers the frequency of the drive signal in accordance with the drive current when the voltage-current phase difference changes.

12 Claims, 23 Drawing Sheets

VARIABLE FOCAL LENGTH LENS DEVICE AND VARIABLE FOCAL LENGTH LENS CONTROL METHOD

The entire disclosure of Japanese Patent Application No. 2017-089576 filed Apr. 28, 2017 is expressly incorporated by reference herein.

TECHNICAL FIELD

The present invention relates to a variable focal length lens device and a variable focal length lens control method.

BACKGROUND ART

A variable focal length lens device employing, for instance, a liquid lens system (simply referred to as a "lens system" hereinafter) based on a principle disclosed in Patent Literature 1 (U.S. Pre-Grant Patent Publication No. 2010/0177376) has been developed.

The lens system includes a cylindrical oscillator made of a piezoelectric material that is immersed in a transparent liquid. When an alternating-current (AC) voltage is applied to an inner circumferential surface and an outer circumferential surface of the oscillator of the lens system, the oscillator expands and contracts in a thickness direction thereof to oscillate the liquid inside the oscillator. Then, when the frequency of the applied AC voltage is tuned to an intrinsic frequency of the liquid, a concentric standing wave is created in the liquid to form concentric regions of different refractive indexes around a center axis of the oscillator. Accordingly, when light is introduced into the oscillator of the lens system along the center axis of the oscillator, the light follows a diverging or converging path according to the refractive index of each of the concentric regions.

The variable focal length lens device includes the above-described lens system and a focusing objective lens (e.g. a typical convex lens or lens group), which are disposed on a common optical axis.

When a parallel light enters a typical objective lens, the light having passed through the lens is focused at a focus position located at a predetermined focal length from the lens. In contrast, when a parallel light enters the lens system disposed coaxially with the objective lens, the light is diverged or converged by the lens system, so that the light having passed through the objective lens is focused at a position closer or farther than the original focus position (i.e. the focus position without the lens system).

Accordingly, an amplitude of a drive signal (an AC voltage of a frequency forming a standing wave in the liquid inside the lens system) inputted to the lens system is increased or decreased in the variable focal length lens device, thereby controlling the focus position of the variable focal length lens device as desired within a predetermined range (i.e. a range with a predetermined variation width capable of being added to/subtracted from the focal length of the objective lens using the lens system).

A sinusoidal AC signal is exemplarily used for the drive signal inputted to the lens system of the variable focal length lens device. When such a sinusoidal drive signal is inputted, the focal length (focus position) of the variable focal length lens device sinusoidally changes. At this time, when the voltage value of the drive signal is 0, the light passing through the lens system is not refracted and the focal length of the variable focal length lens device becomes equal to the focal length of the objective lens. When the voltage of the drive signal is at a positive or negative peak, the light passing through the lens system is most greatly refracted and the focal length of the variable focal length lens device is most deviated from the focal length of the objective lens.

In order to obtain an image using the variable focal length lens device, an illumination signal is outputted in synchronization with a phase of the sine wave of the drive signal to perform a pulsed illumination. Such pulsed illumination on an object at a desired focal length among the sinusoidally changing focal lengths allows for detection of the image of the object at the focal length. When the pulsed illumination is performed at a plurality of phases in one cycle and the image is detected at a timing corresponding to each of the phases, images at a plurality of focal lengths can be obtained in the cycle.

In the variable focal length lens device, a temperature of the liquid inside the above-described lens system and a temperature of the oscillator change by being affected by an ambient temperature and/or a heat generated as a result of the operation of the lens system. An intrinsic frequency also changes due to the temperature change, resulting in a change in a frequency (resonance frequency) of the AC signal forming the standing wave. If the drive signal inputted to the lens system remains the same as the drive signal before the temperature change, the drive signal is deviated from a peak of the resonance frequency, thus failing to efficiently form the standing wave.

A resonance-lock system, which allows the drive signal to be automatically locked to the changed resonance frequency, has thus been used. For instance, it is supposed that a drive signal of a predetermined frequency, at which an intensity level of the standing wave is maximized, is inputted to the lens system. If the level of the standing wave is declined, it is determined that the frequency of the drive signal is deviated from the peak of the resonance capable of forming the standing wave in the lens system, and the frequency of the drive signal is tuned to a new peak position by raising or lowering the frequency of the drive signal. When the frequency of the drive signal reaches the new peak position, the level of the standing wave can be restored to the maximum intensity. Such locking to the peak position is continuously conducted to achieve the automatic locking (resonance lock) to the resonance frequency, at which the standing wave is created.

In order to perform the automatic locking (resonance-lock control) of the drive signal to the resonance frequency in the above-described variable focal length lens device, a value of an effective power inputted to the lens system has been referred to in order to detect the intensity level of the standing wave in the lens system.

When the change in the resonance frequency is detected based on the effective power, the value of a drive current inputted to a drive part of the lens system (i.e. the oscillator formed of a piezoelectric material) is referred to in order to determine a direction in which the peak position of the effective power is locked (i.e. whether the peak is locked to the low-frequency side or the high-frequency side).

The drive current of the lens system has a positive peak (i.e. a peak caused as a result of serial resonance of an equivalent circuit) and a negative peak (i.e. a peak caused as a result of parallel resonance of the equivalent circuit) depending on the characteristics of the piezoelectric material for driving the lens system. The negative peak emerges at a higher frequency than the positive peak (see FIG. 22). The peak of the above-described effective power lies in a range between the positive peak of the drive current and an intermediate value of the positive peak and the negative peak. In other words, the drive current shows a negatively sloped pattern in the vicinity of the peak position of the effective power.

Accordingly, when the peak position of the effective power, which corresponds to the resonance frequency of the lens system, is shifted, the direction in which the peak position is shifted can be detected by determining the increase/decrease in the drive current in the vicinity of the resonance frequency.

FIG. 20 shows a specific process for the resonance-lock control in a typical variable focal length lens device.

The peak of the effective power Rp is scanned by the variable focal length lens device as an initial setting at the start of the resonance lock (Step S01 in FIG. 20). As shown in FIG. 21, the drive signal is inputted to the lens system while the frequency of the drive signal is gradually raised from a predetermined lower limit fmin to a predetermined upper limit fmax, and the effective power Rp consumed by the lens system at each of the frequencies is registered in the peak-scanning.

Subsequently, a frequency fpp, at which the effective power Rp becomes a peak value pp, is detected based on the obtained scan results, and the frequency of the drive signal is tuned to the frequency fpp (Step S02).

After the initial setting, the variable focal length lens device sends the drive signal at the previously tuned frequency fpp to the lens system to create a standing wave in the lens system (an operation mode). During the operation mode, the variable focal length lens device acquires the effective power Rp and a drive current Ri at a predetermined cycle (Step S03 in FIG. 20) to monitor a decrease in the effective power Rp (Step S04).

In the absence of the decrease in the effective power Rp, it is determined that the resonance frequency fpp is not changed and the monitoring in Steps S03 and S04 is continued. In contrast, if the decrease in the effective power Rp is detected, it is determined that the resonance frequency fpp is changed, and whether the drive current Ri is decreased is determined (Step S05). When the drive current Ri is decreased, the resonance frequency fpp is lowered (Step S06). When the drive current Ri is increased, the resonance frequency fpp is raised (Step S07).

As shown in FIG. 22, it is supposed that the resonance frequency of the lens system rises from the frequency fpp (solid line) to a frequency fpu (dashed line) due to a temperature increase and the like.

If the frequency of the drive signal stays at the original frequency fpp, the effective power consumed in the lens system, the resonance frequency of which is changed to the frequency fpd (dashed line), decreases from pp (peak value) to pu. As described above, the change in the peak frequency, which appears as a decrease in the effective power, can be detected in Step S05.

If the frequency of the drive signal stays at the original frequency fpp irrespective of the increase in the resonance frequency of the lens system (from fpp to fpu), the drive current Ri (dashed line) for the lens system, of which resonance frequency is changed to fpu, increases from ipp to ipu. Accordingly, it is determined in Step S05 that the drive current Ri is increased, and the resonance frequency of the drive signal is raised from fpp to fpu in Step S07.

In contrast, when the resonance frequency of the lens system is lowered, the peak position of the effective power Rp is shifted in a direction opposite the shift direction of the dashed line in FIG. 22. If the frequency of the drive signal stays at the original frequency, contrary to FIG. 22, the drive current Ri decreases in the lens system whose resonance frequency has changed. Accordingly, it is determined in Step S05 that the drive current Ri is decreased in Step S05, and the resonance frequency of the drive signal is lowered in Step S06.

As described above, the frequency of the drive signal is raised when the resonance frequency of the lens system is raised and the frequency of the drive signal is lowered when the resonance frequency of the lens system is lowered. Consequently, the drive signal is locked to the resonance frequency of the lens system.

The above-described resonance-lock control for the variable focal length lens device is based on the negatively sloped characteristics of the drive current Ri in the vicinity of the peak position of the effective power Rp of the lens system.

However, in some of the lens systems, the frequency of the effective power Rp at the peak position becomes close to the frequency of the drive current Ri at the positive peak position due to the characteristics of piezoelectric elements for driving the lens systems.

It is supposed that, as shown in FIG. 23, the frequency fpp of the effective power Rp at the peak position is close to the frequency of the drive current Ri at the positive peak position. When the frequency at the peak position of the effective power Rp rises to the frequency fpu, the drive current Ri decreases (from ipp to ipu). However, when the frequency at the peak position of the effective power Rp drops to the frequency fpd, the drive current Ri also decreases (from ipp to ipd).

In other words, the value of the drive current Ri decreases irrespective of rise or drop in the frequency at the peak position of the effective power Rp, possibly resulting in a failure in the resonance-lock control by locking to the peak position.

SUMMARY OF THE INVENTION

An object of the invention is to provide a variable focal length lens device and a method of controlling a variable focal length lens capable of stably performing a resonance-lock control.

A variable focal length lens device according to an aspect of the invention includes: a lens system whose refractive index changes in accordance with an inputted drive signal; and a resonance-lock controller configured to lock the drive signal to a resonance frequency of the lens system, in which the resonance-lock controller is configured to tune a frequency of the drive signal to a peak position of a voltage-current phase difference between a voltage of the drive signal and a drive current of the lens system, and to raise or lower the frequency of the drive signal based on the drive current when the voltage-current phase difference is changed.

A method according to another aspect of the invention is for controlling a variable focal length lens device including: a lens system whose refractive index changes in accordance with an inputted drive signal; and a resonance-lock controller configured to lock the drive signal to a resonance frequency of the lens system, the method including: tuning a frequency of the drive signal to a peak position of a voltage-current phase difference between a voltage of the drive signal and a drive current of the lens system; and raising or lowering the frequency of the drive signal in accordance with the drive current when the voltage-current phase difference is changed.

According to the above aspects of the invention, the resonance-lock control of the drive signal is performed based on the voltage-current phase difference between the drive current flowing in the lens system and the voltage of the drive signal causing the flow of the drive current. The peak position of the voltage-current phase difference appears at a frequency higher than a peak position of an effective power during an operation of the lens system. In other words, the peak position of the voltage-current phase difference can be set at a position with a higher frequency in a negatively sloped section ranging from a positive peak position to a negative peak position of the drive current. Thus, even when the frequency at the peak position of the voltage-current phase difference is changed to a lower-frequency side due to a change in the resonance frequency of the lens system, the frequency is less likely to come close to the positive peak position of the drive current. As a result, a failure in determining the direction of the change in the drive current and a consequent failure in the resonance-lock control by locking to the peak position are less likely to occur, so that the resonance-lock control of the variable focal length lens device can be stably performed.

A variable focal length lens device according to still another aspect of the invention includes: a lens system whose refractive index changes in accordance with an inputted drive signal; and a resonance-lock controller configured to lock the drive signal to a resonance frequency of the lens system, in which the resonance-lock controller is configured to set a target effective power that is lower than a peak value of an effective power of the lens system, to tune a frequency of the drive signal to a frequency at which the target effective power is provided, and to raise or lower the frequency of the drive signal in accordance with an increase or decrease in the effective power when the effective power is changed.

A method according to a further aspect of the invention is for controlling a variable focal length lens device including: a lens system whose refractive index changes in accordance with an inputted drive signal; and a resonance-lock controller configured to lock the drive signal to a resonance frequency of the lens system, the method including: setting a target effective power that is lower than a peak value of an effective power of the lens system; tuning a frequency of the drive signal to a frequency at which the target effective power is provided; and raising or lowering the frequency of the drive signal in accordance with an increase or decrease in the effective power when the effective power is changed.

According to the above aspects of the invention, the resonance-lock control of the drive signal is performed based solely on the effective power of the lens system. Accordingly, the target effective power is set at a value lower than the peak value of the effective power of the lens system. The value of the effective power continuously decreases from the peak value along a positive or negative slope in the vicinity of the value of the target effective power. Accordingly, the direction for changing the frequency of the drive signal can be determined by referring to the value of the effective power in the vicinity of the target effective power upon a change in the resonance frequency of the lens system with respect to the frequency of the drive signal at which the target effective power is provided. The lens system can be stably operated at the resonance frequency by raising/lowering the frequency of the drive signal based on the determined direction.

A variable focal length lens device according to still further aspect of the invention includes: a lens system whose refractive index changes in accordance with an inputted drive signal; and a resonance-lock controller configured to lock the drive signal to a resonance frequency of the lens system, in which the resonance-lock controller is configured to set a target voltage-current phase difference that is lower than a peak value of a voltage-current phase difference between a voltage of the drive signal and a drive current of the lens system, to tune a frequency of the drive signal to a frequency at which the target voltage-current phase difference is provided, and to raise or lower the frequency of the drive signal in accordance with an increase or decrease in the voltage-current phase difference when the voltage-current phase difference is changed.

A method according to still further aspect of the invention is for controlling a variable focal length lens device including: a lens system whose refractive index changes in accordance with an inputted drive signal; and a resonance-lock controller configured to lock the drive signal to a resonance frequency of the lens system, the method including: setting a target voltage-current phase difference that is lower than a peak value of a voltage-current phase difference between a voltage of the drive signal and a drive current of the lens system; tuning a frequency of the drive signal to a frequency at which the target voltage-current phase difference is provided; and raising or lowering the frequency of the drive signal based on an increase or decrease in the voltage-current phase difference when the voltage-current phase difference is changed.

According to the above aspects of the invention, the resonance-lock control of the drive signal is performed based solely on the voltage-current phase difference between the voltage of the drive signal and the drive current of the lens system. For the above purpose, the target voltage-current phase difference is set at a value lower than the peak value of the voltage-current phase difference. The value of the voltage-current phase difference continuously decreases from the peak value along a positive or negative slope in the vicinity of the value of the target voltage-current phase difference. Accordingly, the direction for changing the frequency of the drive signal can be determined by referring to the value of the voltage-current phase difference in the vicinity of the target voltage-current phase difference upon a change in the resonance frequency of the lens system with respect to the frequency of the drive signal at which the target voltage-current phase difference is provided. The lens system can be stably operated at the resonance frequency by raising/lowering the frequency of the drive signal based on the determined direction.

According to the above aspects of the invention, a variable focal length lens device and a method of controlling a variable focal length lens capable of stably performing the resonance-lock control can be provided.

BRIEF DESCRIPTION OF DRAWING(S)

DESCRIPTION OF EMBODIMENT(S)

First Exemplary Embodiment

Figure 1:
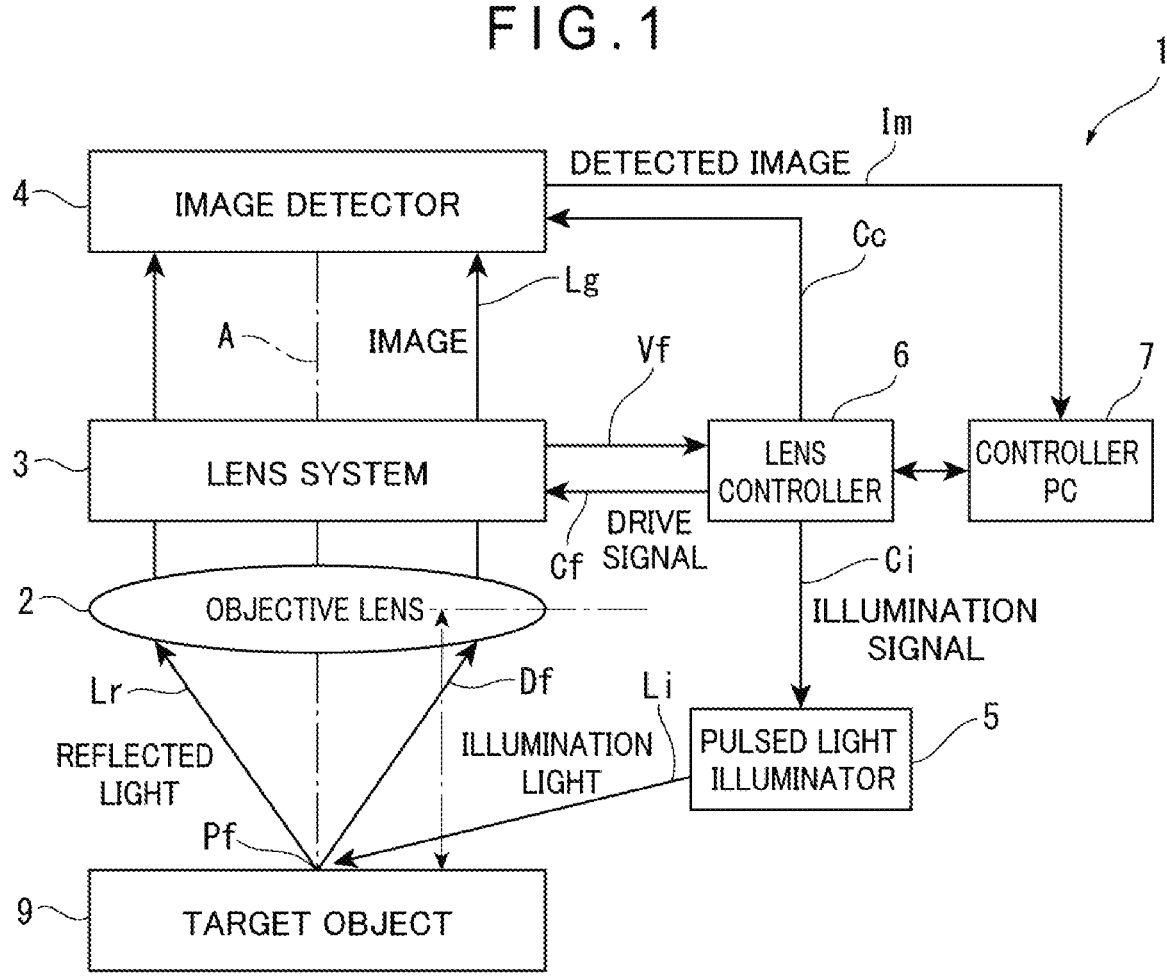
FIG. 1 is a schematic illustration showing a first exemplary embodiment of the invention.

As shown in FIG. 1, in order to detect an image of a surface of a target object 9 while changing a focal length, a variable focal length lens device 1 includes: an objective lens 2; a lens system 3; and an image detector 4, the objective lens 2, the lens system 3 and the image detector 4 being disposed on a common optical axis A intersecting the surface of the target object 9.

The variable focal length lens device 1 further includes: a pulsed light illuminator 5 configured to apply pulsed illumination on the surface of the target object 9; a lens controller 6 configured to control operations of the lens system 3 and the pulsed light illuminator 5; and a controller PC 7 configured to operate the lens controller 6.

An existing personal computer is used as the controller PC 7. The desired function of the controller PC 7 is achieved by running a predetermined control software on the controller PC 7. The controller PC 7 is also configured to capture and process an image from the image detector 4.

An existing convex lens is used as the objective lens 2.

The image detector 4 includes an existing charge coupled device (CCD) image sensor, other type of a camera or the like, and is configured to receive an image Lg and output the image Lg to the controller PC 7 in a form of a detected image Im of a predetermined format.

The pulsed light illuminator 5 includes a light-emitting element such as a light emitting diode (LED). The pulsed light illuminator 5 is configured to emit an illumination light Li only for a predetermined time to apply the pulsed illumination on the surface of the target object 9 when an illumination signal Ci is inputted from the lens controller 6. The illumination light Li is reflected at the surface of the target object 9. A reflected light Lr from the surface of the target object 9 forms the image Lg through the objective lens 2 and the lens system 3.

The lens system 3 is configured to change a refractive index thereof depending on a drive signal Cf inputted by the lens controller 6. The drive signal Cf is a sinusoidal AC signal of a frequency capable of forming a standing wave in the lens system 3.

A focal length Df to a focus position Pf of the variable focal length lens device 1 can be changed as desired based on a focal length of the objective lens 2 by changing the refractive index of the lens system 3.

Figure 2:
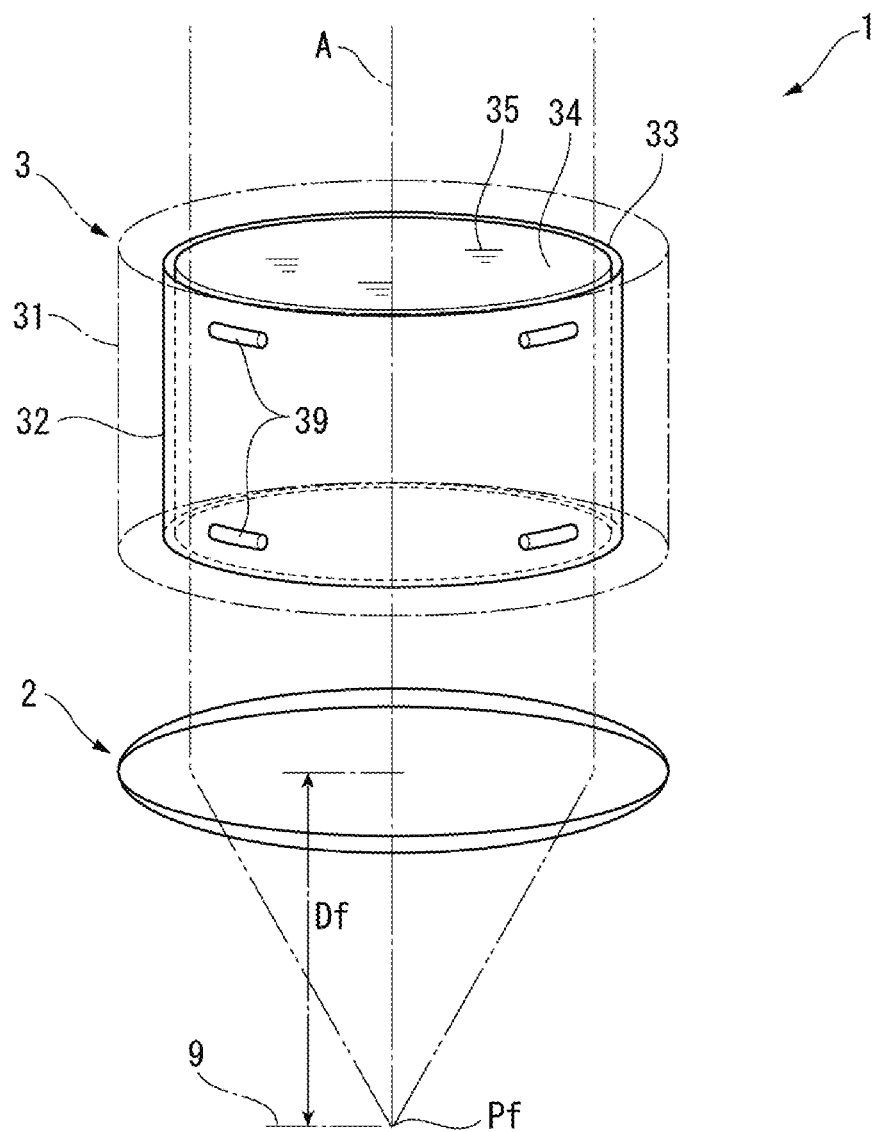
FIG. 2 is a schematic illustration showing an arrangement of a lens system according to the first exemplary embodiment.

As shown in FIG. 2, the lens system 3 includes a cylindrical case 31 and a cylindrical oscillator 32 disposed inside the case 31. The oscillator 32 includes an outer circumferential surface 33 and is supported by an elastomeric spacer 39 interposed between the outer circumferential surface 33 and an inner circumferential surface of the case 31.

The oscillator 32 is a cylindrical component made from a piezoelectric material. The oscillator 32 is configured to oscillate in a thickness direction thereof when the AC voltage of the drive signal Cf is applied between the outer circumferential surface 33 and an inner circumferential surface 34 of the oscillator 32.

A highly transparent liquid 35 is filled in the case 31. The oscillator 32 is entirely immersed in the liquid 35 and an interior of the cylindrical oscillator 32 is filled with the liquid 35. The frequency of the AC voltage of the drive signal Cf is tuned to a frequency capable of forming a standing wave in the liquid 35 inside the oscillator 32.

Figure 3:
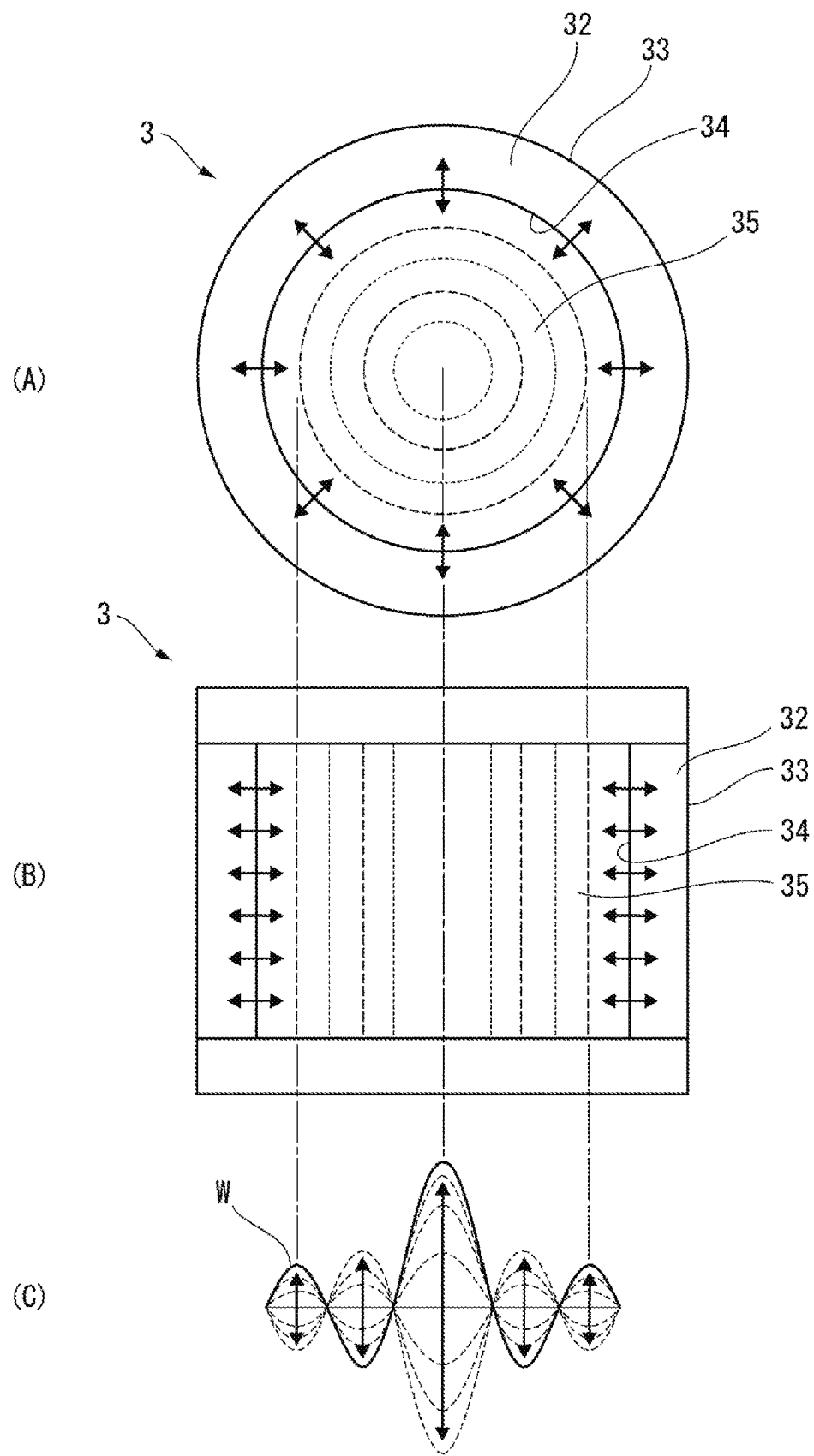
FIG. 3 is a schematic illustration showing an oscillating state of the lens system according to the first exemplary embodiment.

As shown in FIG. 3, when the oscillator 32 is oscillated, a standing wave is formed in the liquid 35 in the lens system 3 to create concentric regions with alternating refractive indexes (see FIGS. 3(A) and 3(B)).

A relationship between a distance (radius) from a central axis of the lens system 3 and the refractive index of the liquid 35 at this time is represented by a refractive index distribution W shown in FIG. 3(C).

Figure 4:
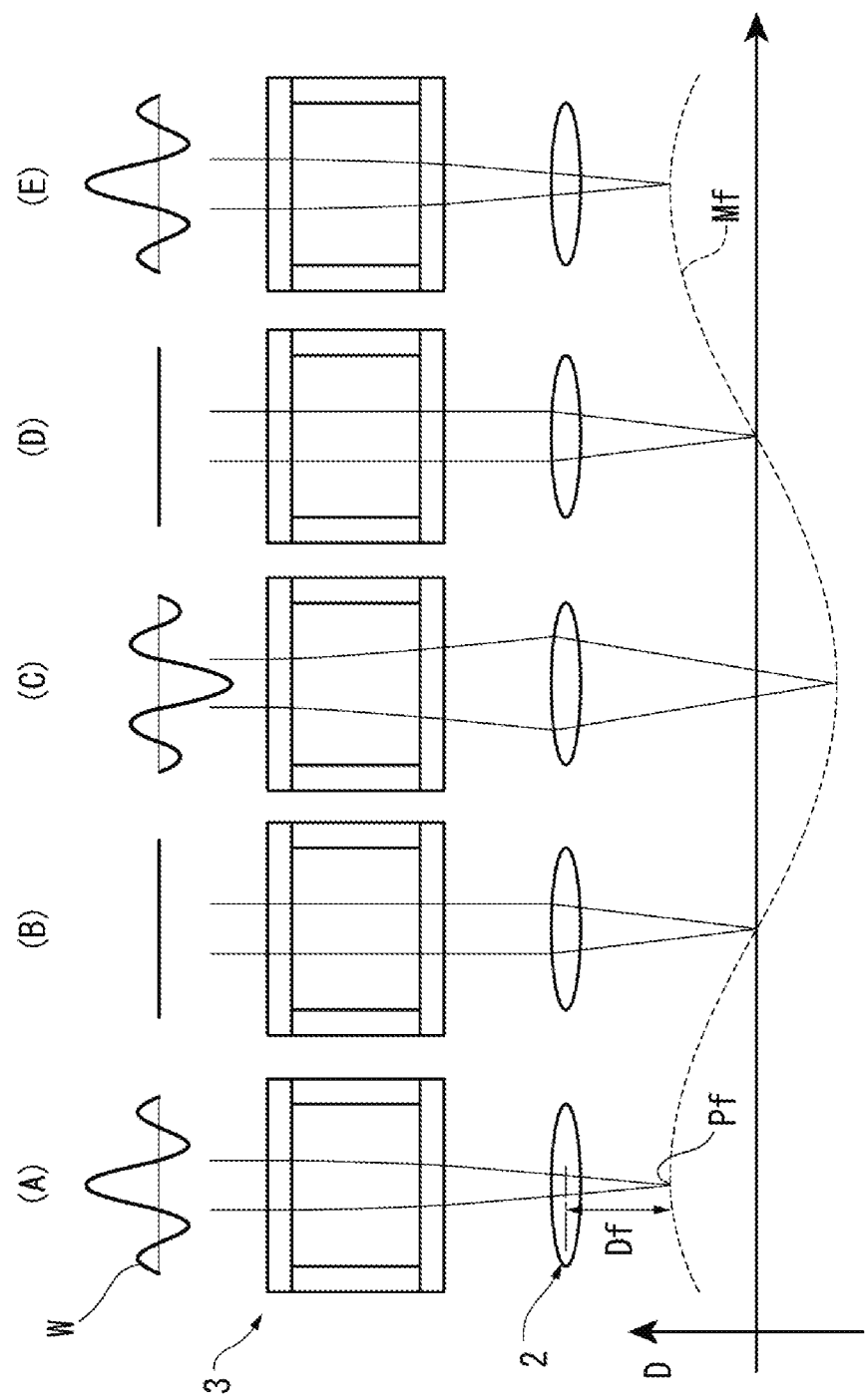
FIG. 4 is a schematic illustration showing a focal length of the lens system according to the first exemplary embodiment.

As shown in FIG. 4, since the drive signal Cf is a sinusoidal AC signal, a variation width of the refractive index distribution W of the liquid 35 in the lens system 3 also changes in accordance with the drive signal Cf. The refractive index of the concentric regions formed in the liquid 35 sinusoidally changes to cause a sinusoidal variation in the focal length Df to the focus position Pf.

A difference between the maximum and minimum values in the refractive index distribution W is maximized in the state shown in FIG. 4(A), where the lens system 3 converges the light passing therethrough, the focus position Pf is located close to the lens system 3 and the focal length Df is shortest.

The refractive index distribution W is flat in the state shown in FIG. 4(B), where the lens system 3 lets the light through without refraction, and the focus position Pf and the focal length Df are at reference values.

The difference between the maximum and minimum values in the refractive index distribution W is maximized in the state shown in FIG. 4(C) with a polarity reverse to that in FIG. 4(A)), where the lens system 3 diverges the light passing therethrough, the focus position Pf is located remote from the lens system 3 and the focal length Df is largest.

The refractive index distribution W is again flat in the state shown in FIG. 4(D), where the lens system 3 lets the light through without refraction, and the focus position Pf and the focal length Df are at the reference values.

The refractive index distribution W in FIG. 4(E) is returned to the state in FIG. 4(A), and the same variation in the refractive index distribution W will be repeated thereafter.

As described above, the drive signal Cf of the variable focal length lens device 1 is a sinusoidal AC signal and the focus position Pf and the focal length Df also sinusoidally changes as shown in a focus-position-variation waveform Mf in FIG. 4.

By applying the pulsed illumination on the target object 9 at any of the focus positions Pf in the focus-position-variation waveform Mf and detecting an image illuminated at this time, the image of the illuminated target object at the focus position Pf at a desired focal length Df can be obtained.

Referring back to FIG. 1, the oscillation of the lens system 3, the illumination of the pulsed light illuminator 5 and the image-detection of the image detector 4 of the variable focal length lens device 1 are controlled based on the drive signal Cf, the illumination signal Ci and an image-detection signal Cc from the lens controller 6. The controller PC 7 is connected in order to, for instance, configure the setting of the lens controller 6 that controls the above components.

Figure 5:
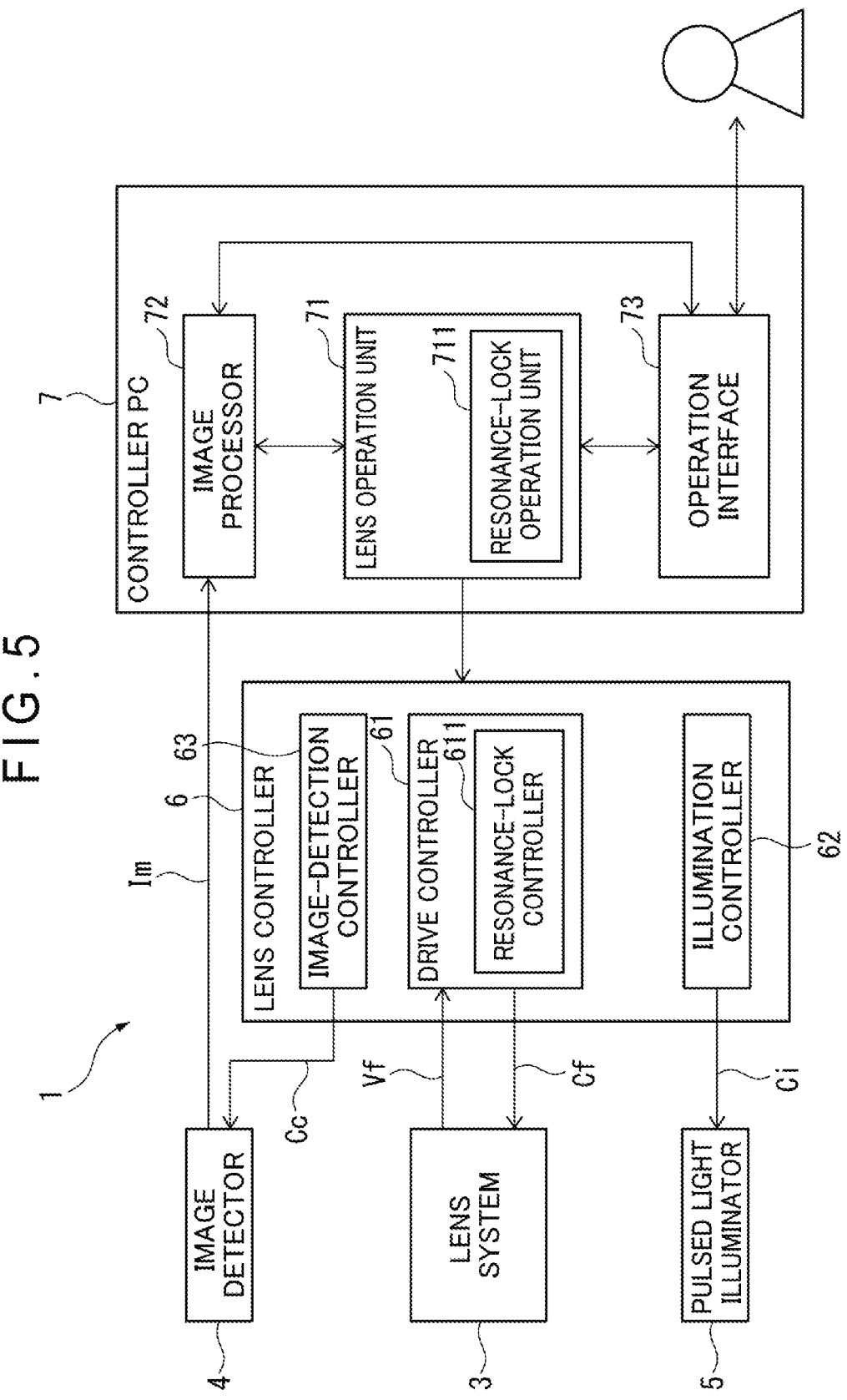
FIG. 5 is a block diagram showing a relevant part of the first exemplary embodiment.

As shown in FIG. 5, the lens controller 6 includes: a drive controller 61 configured to output the drive signal Cf to the lens system 3; an illumination controller 62 configured to output the illumination signal Ci to the pulsed light illuminator 5; and an image-detection controller 63 configured to output the image-detection signal Cc to the image detector 4.

The drive controller 61 includes a resonance-lock controller 611.

The resonance-lock controller 611 is configured to detect oscillation conditions Vf of the lens system 3 based on an effective power Rp or a drive current Ri applied to the lens system 3 when the lens system 3 is oscillated in response to the inputted drive signal Cf. The resonance-lock controller 611 tunes the frequency of the drive signal Cf with reference to the oscillation conditions Vf of the lens system 3 to allow the frequency of the drive signal Cf to be locked to a current resonance frequency of the lens system 3. It should be noted that the oscillation conditions Vf may be detected by an oscillation sensor disposed in the lens system 3.

Figure 6:
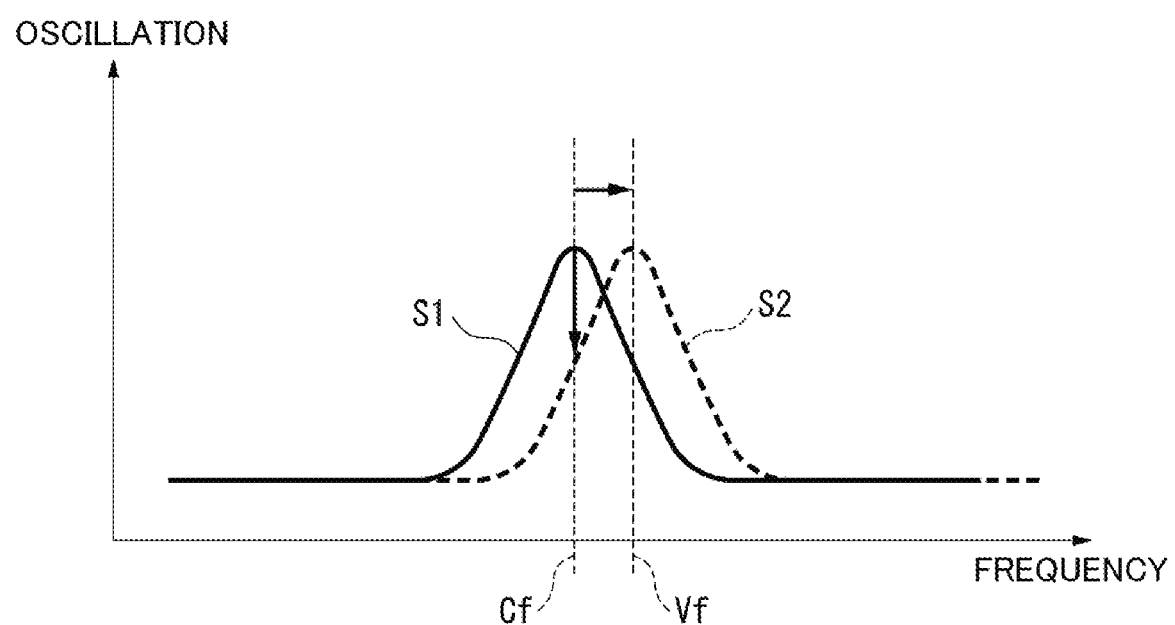
FIG. 6 is a graph showing a change in a resonance frequency in the first exemplary embodiment.

Assuming that the oscillation characteristics of the lens system 3 are represented by S1 in FIG. 6, the frequency of the drive signal Cf is set at the peak of the oscillation characteristics S1. In the absence of any temperature change in the lens system 3, the frequency at the peak position of the oscillation characteristics of the lens system 3 detected by the resonance-lock controller 611 stays at the frequency at the peak of the oscillation characteristics S1 of the drive signal Cf.

With regard to the above, it is supposed that the oscillation characteristics of the lens system 3 are changed to S2 due to the temperature change and the like. Then, the oscillation characteristics of the lens system 3 detected by the resonance-lock controller 611 show a different peak (i.e. the peak of the oscillation characteristics S2), which is shifted from the peak of the drive signal Cf. If the drive signal Cf is inputted to the lens system 3 having the oscillation characteristics S2, the frequency of the drive signal Cf, which does not match the peak position of the oscillation characteristics S2, cannot provide sufficient effective power to the lens system 3, thereby decreasing the efficiency.

Figure 7:
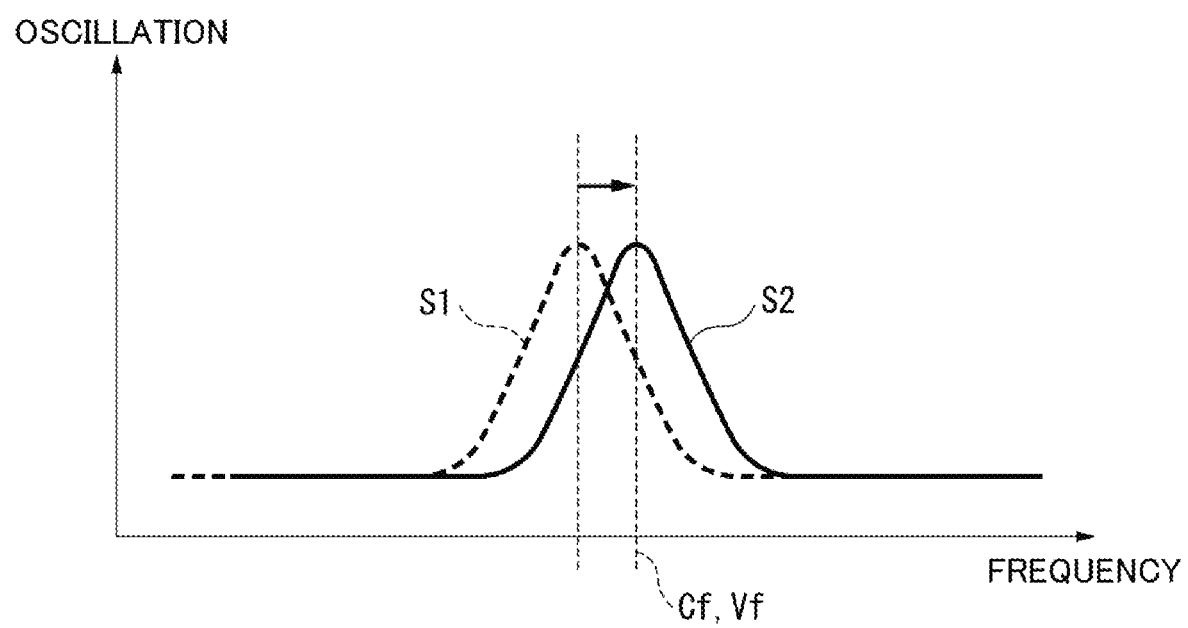
FIG. 7 is a graph showing an outline of a resonance lock in the first exemplary embodiment.

As shown in FIG. 7, upon detecting a deviation between the detected oscillation conditions Vf of the lens system 3 and the drive signal Cf inputted from the drive controller 61 to the lens system 3, the resonance-lock controller 611 searches for and captures the current peak position of the lens system 3, and changes the frequency of the drive signal Cf outputted from the drive controller 61 to the frequency at the current peak position.

Consequently, the frequency of the drive signal Cf inputted from the drive controller 61 to the lens system 3 is tuned to the peak of the resonance frequency of the current oscillation characteristics S2 of the lens system 3, thereby automatically locking the frequency to the resonance frequency.

Referring back to FIG. 5, the controller PC 7 includes: a lens operation unit 71 configured to operate the lens controller 6 (e.g. configure the setting of the lens controller 6); an image processor 72 configured to capture and process the detected image Im from the image detector 4; and an operation interface 73 configured to receive a user's operation on the variable focal length lens device 1.

The lens operation unit 71 includes a resonance-lock operation unit 711.

The resonance-lock operation unit 711 is configured to switch the state (i.e. enable/disable) of the resonance-lock controller 611 of the drive controller 61.

Figure 8:
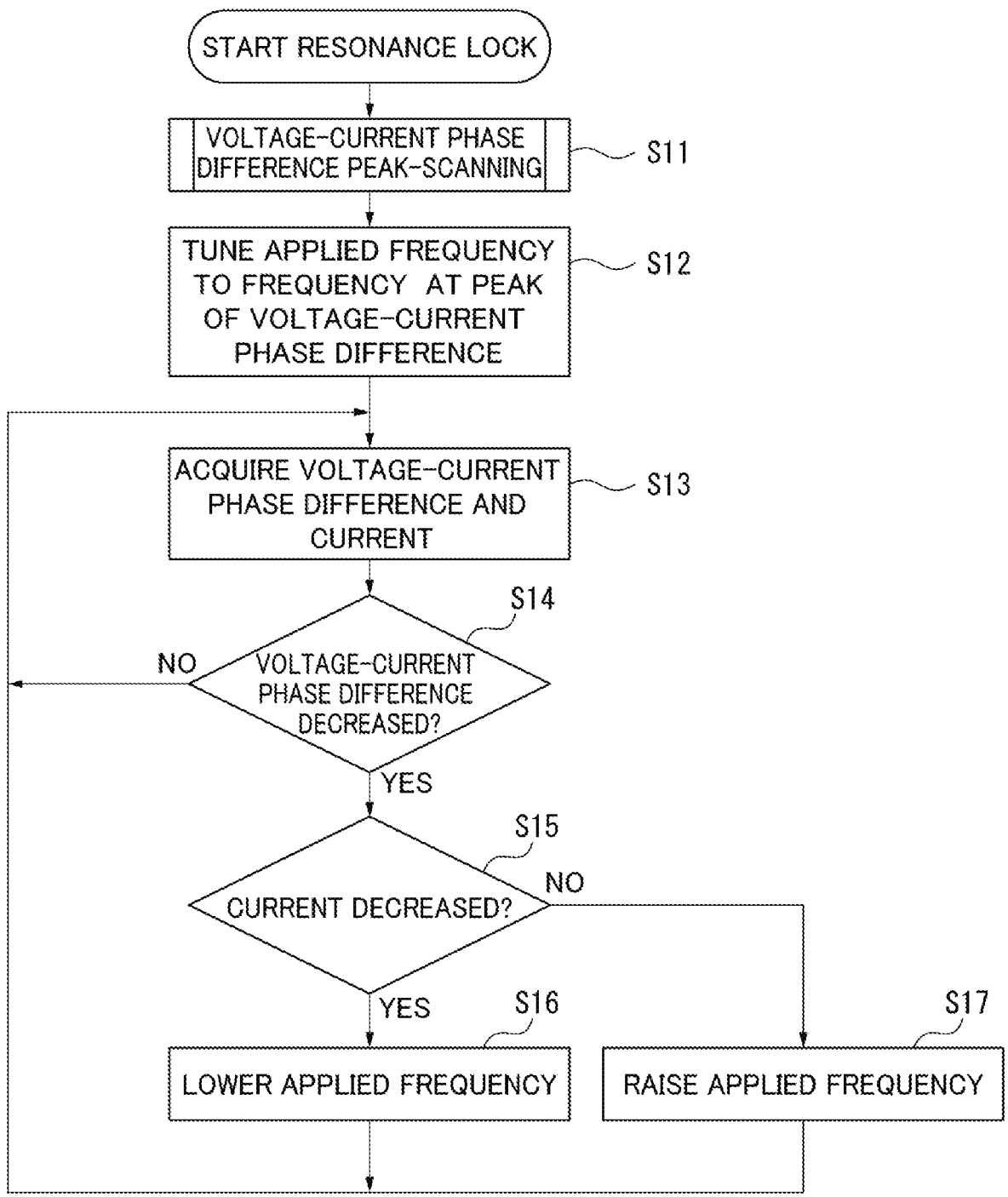
FIG. 8 is a flow chart showing procedures of the resonance lock in the first exemplary embodiment.
Figure 9:
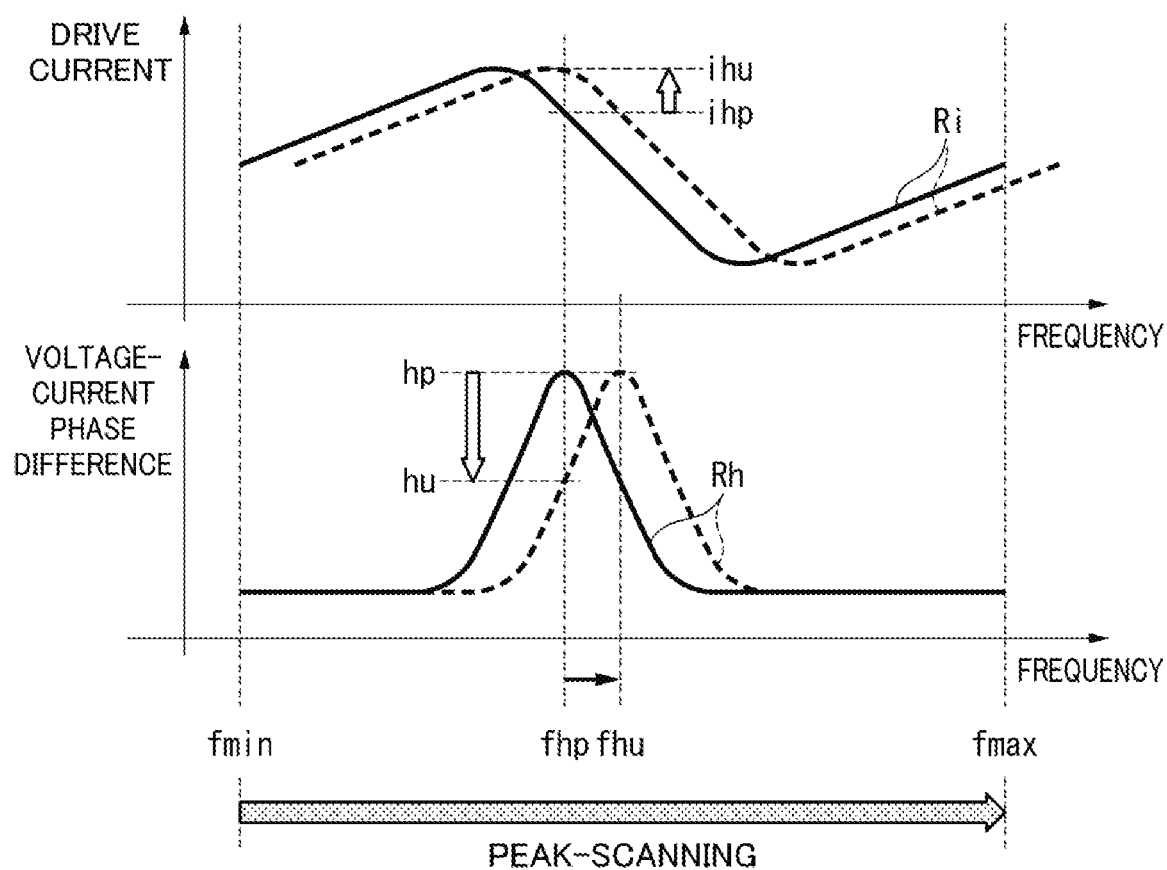
FIG. 9 shows graphs showing an operation in the resonance lock in the first exemplary embodiment.
Figure 10:
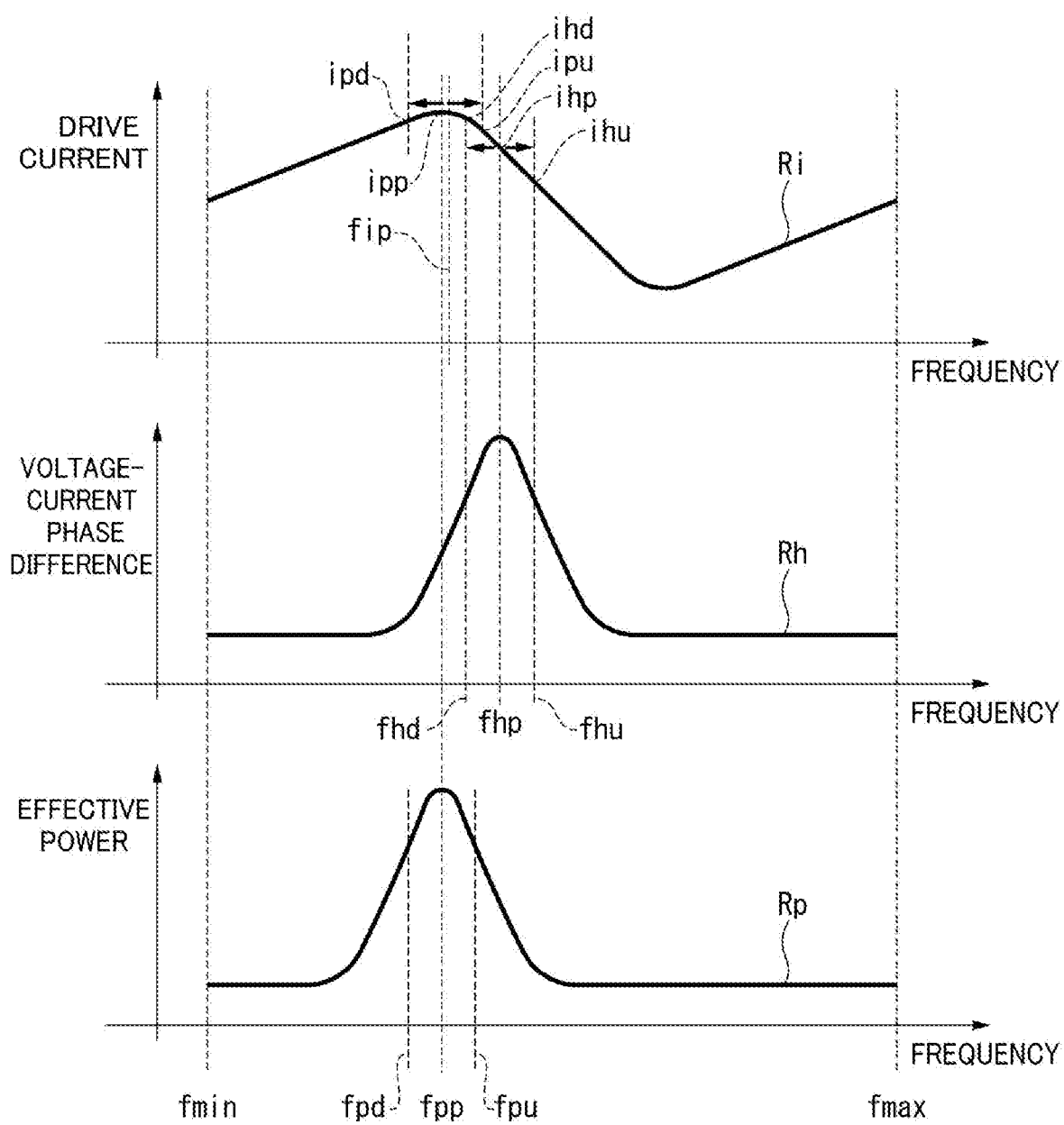
FIG. 10 shows graphs showing an effect of the resonance lock in the first exemplary embodiment.

FIGS. 8 to 10 show a resonance-lock control according to the first exemplary embodiment.

In the first exemplary embodiment, before the lens system 3 is activated, the resonance-lock controller 611 detects a voltage-current phase difference Rh based on a voltage waveform of the drive signal Cf and a waveform of the drive current Ri of the lens system 3 and sets the frequency of the drive signal Cf at a peak position of the voltage-current phase difference Rh. During the operation of the lens system 3, the resonance-lock controller 611 monitors the voltage-current phase difference Rh. When a change in the voltage-current phase difference Rh is detected, the resonance-lock controller 611 raises or lowers the frequency of the drive signal Cf based on the drive current Ri.

As shown in FIG. 8, the resonance-lock controller 611 performs the peak-scanning of the voltage-current phase difference Rh as an initial setting at the start of the resonance lock (Step S11).

As shown in FIG. 9, the drive signal Cf is inputted to the lens system 3 while the frequency of the drive signal Cf is gradually raised from a predetermined lower limit fmin to a predetermined upper limit fmax, and the voltage-current phase difference Rh in the lens system 3 at each of the frequencies is registered in the peak-scanning.

Subsequently, a frequency fhp, at which the voltage-current phase difference Rh becomes a peak value, is detected based on the scan results, and the frequency of the drive signal Cf is tuned to the frequency fhp (Step S12 in FIG. 8).

After the initial setting, the variable focal length lens device 1 is driven. Specifically, the resonance-lock controller 611 sends the drive signal Cf of the previously tuned frequency fhp to the lens system 3. Thus, the standing wave is created in the lens system 3 to turn the lens system 3 into an operation mode.

During the operation, the resonance-lock controller 611 acquires the voltage-current phase difference Rh at a predetermined cycle (Step S13) to monitor a decrease in the voltage-current phase difference Rh (Step S14).

In the absence of a decrease in the voltage-current phase difference Rh, it is determined that the resonance frequency fhp is not changed and the monitoring in Steps S13 and S14 is continued.

In contrast, if a decrease in the voltage-current phase difference Rh is detected, it is determined that the resonance frequency fhp is changed and whether a decrease in the drive current Ri is detected is determined (Step S15). When the drive current Ri is decreased, the resonance frequency fhp is lowered (Step S16). When the drive current Ri is increased, the resonance frequency fhp is raised (Step S17).

As shown in FIG. 9, it is supposed that the resonance frequency of the lens system 3 rises from the frequency fhp (solid line) to a frequency fhu (dashed line) due to a temperature increase and the like.

If the frequency of the drive signal Cf stays at the original frequency fhp, the voltage-current phase difference Rh (dashed line) in the lens system 3 whose resonance frequency is changed to the frequency fhu decreases from hp (peak value) to hu. As described above, the change in the resonance frequency, which appears as a decrease in the voltage-current phase difference Rh, can be detected in Step S15.

If the frequency of the drive signal Cf stays at the original frequency fhp irrespective of the increase in the resonance frequency of the lens system 3 (from fhp to fhu), the drive current Ri (dashed line) for the lens system 3, of which the resonance frequency is changed to fhu, increases from ihp to ihu. Accordingly, it is determined in Step S15 that the drive current Ri is increased, and the frequency of the drive signal Cf is raised from fhp to fhu in Step S17.

If the resonance frequency of the lens system 3 decreases from the frequency fhp in contrast to that shown in FIG. 9, the drive current Ri, which is negatively sloped in the vicinity of the frequency fhp, increases in value. Accordingly, it is determined in Step S15 that the drive current Ri in a frequency range lower than the frequency fhp is increased with respect to the original ihp, and the frequency of the drive signal Cf is lowered from fhp in Step S16.

As described above, the frequency of the drive signal Cf is raised when the resonance frequency of the lens system 3 is raised and the frequency of the drive signal Cf is lowered when the resonance frequency of the lens system 3 is lowered. Consequently, the frequency of the drive signal Cf is locked to the resonance frequency of the lens system 3.

In the first exemplary embodiment, the deviation of the frequency of the drive signal Cf is detected with reference to the voltage-current phase difference Rh, and a compensation direction of the frequency of the drive signal Cf is determined based on the change in the drive current Ri.

As shown in FIG. 10, the frequency fhp at the peak position of the voltage-current phase difference Rh is usually present at a frequency higher than the frequency fpp at the peak position of the effective power Rp during the operation of the lens system 3.

In other words, with the use of the voltage-current phase difference Rh, the frequency fhp at the peak position of the voltage-current phase difference Rh can be set in a higher frequency range in the negatively sloped section between the positive peak position to the negative peak position of the drive current Ri.

As shown in FIG. 10, irrespective of the change in the frequency fhp at the peak position of the voltage-current phase difference Rh (i.e. decrease from the frequency fhp to the frequency fhd or increase from the frequency fhp to the frequency fhu), the value (ipp, ipd, ipu) of the drive current Ri in the above section is constantly negatively sloped.

Accordingly, the direction in the change in the resonance frequency (Step S15 in FIG. 8) can be reliably detected.

In contrast, the peak position (frequency fip) of the drive current Ri is present within the section defined by the change in the frequency fpp of the effective power Rp (i.e. decrease from the frequency fpp to the frequency fpd or increase from the frequency fpp to the frequency fpu). Accordingly, both of the values (ipd, ipu) of the drive current Ri on both sides of the peak position of the drive current Ri are decreased with respect to the value ipp at the peak position, thereby possibly failing to reliably detect the direction in the change in the resonance frequency based on the effective power Rp (Step S15 in FIG. 8).

Thus, even when the frequency fhp at the peak position of the voltage-current phase difference Rh is changed to a lower-frequency side due to a change in the resonance frequency of the lens system 3, the frequency fhp is less likely to come close to the positive peak position of the drive current Ri. Consequently, although the typical method based on the effective power Rp is less likely to be unable to perform the resonance-lock control due to such failure, since the frequency fpp at the peak position of the resonance frequency is so close to one at the peak position of the drive current Ri that the value of the drive current Ri decreases in the vicinity of (i.e. on both sides of) the frequency fpp in the first exemplary embodiment. Thus, the resonance-lock control of the variable focal length lens device 1 can be stably performed.

Second Exemplary Embodiment

Figure 11:
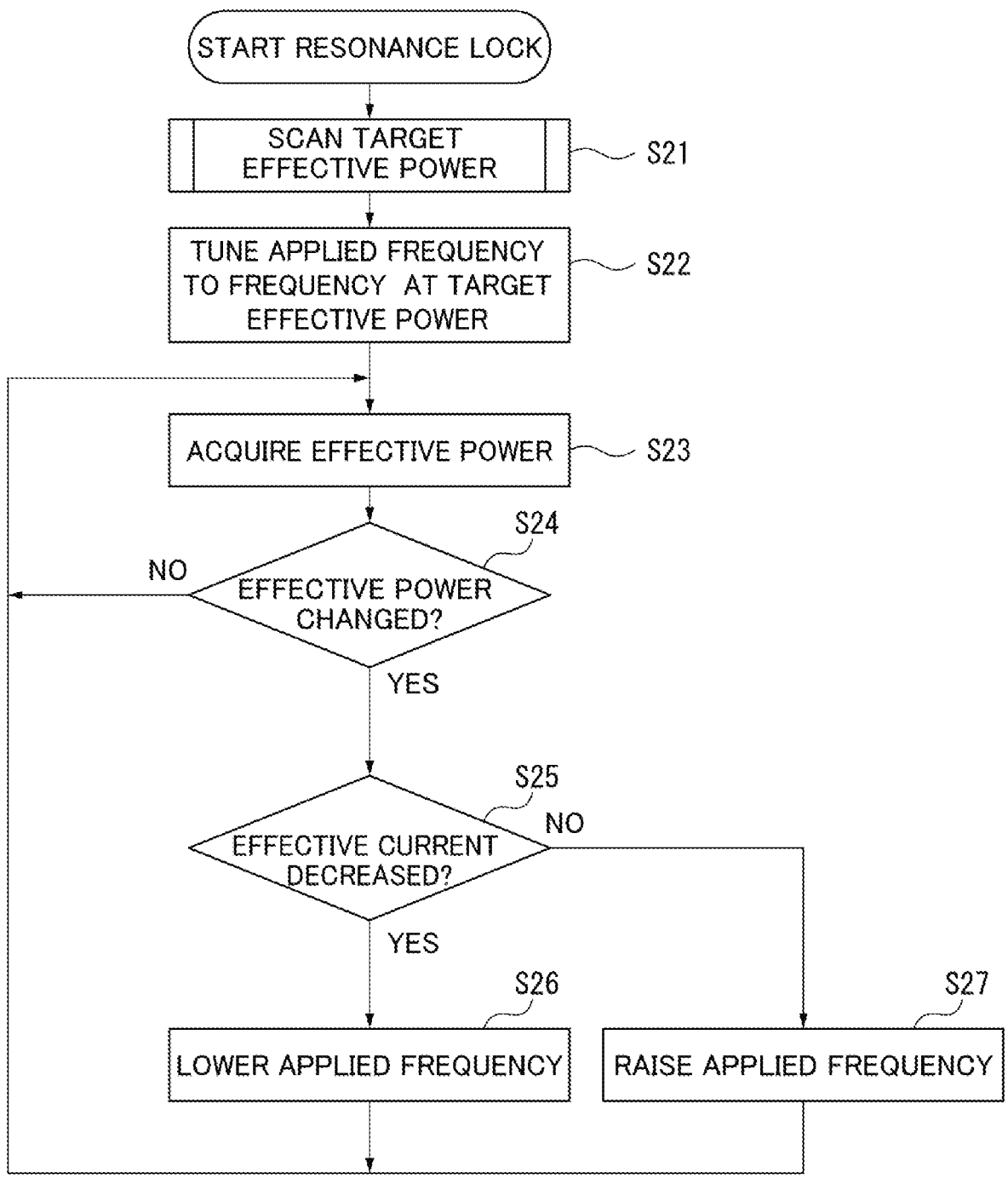
FIG. 11 is a flow chart showing procedures of a resonance lock in a second exemplary embodiment of the invention.
Figure 12:
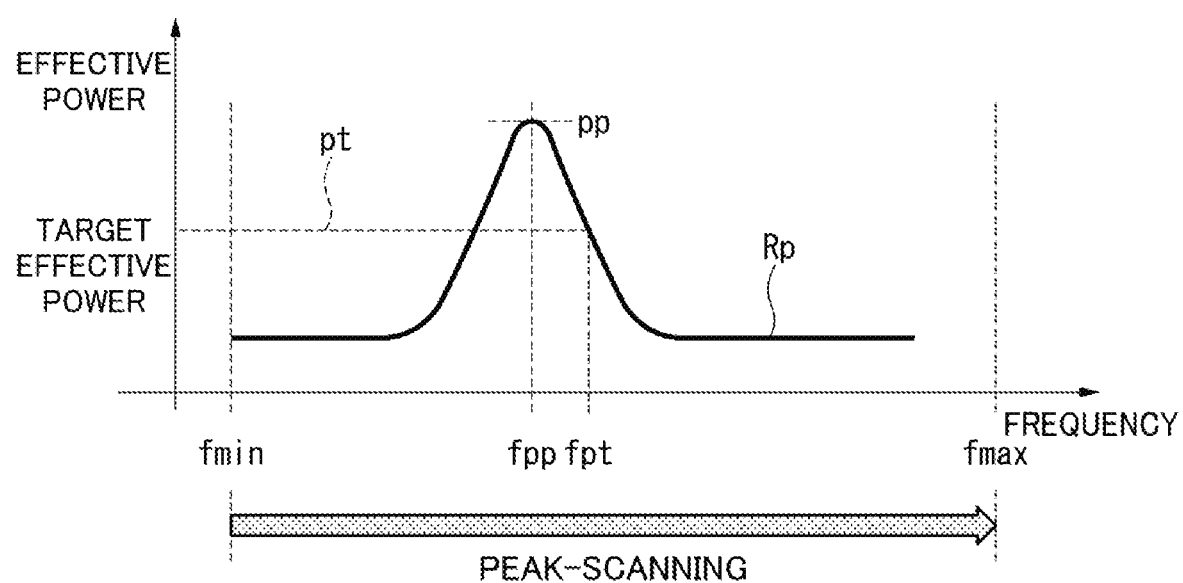
FIG. 12 is a graph showing a setting of the resonance lock in the second exemplary embodiment.
Figure 13:
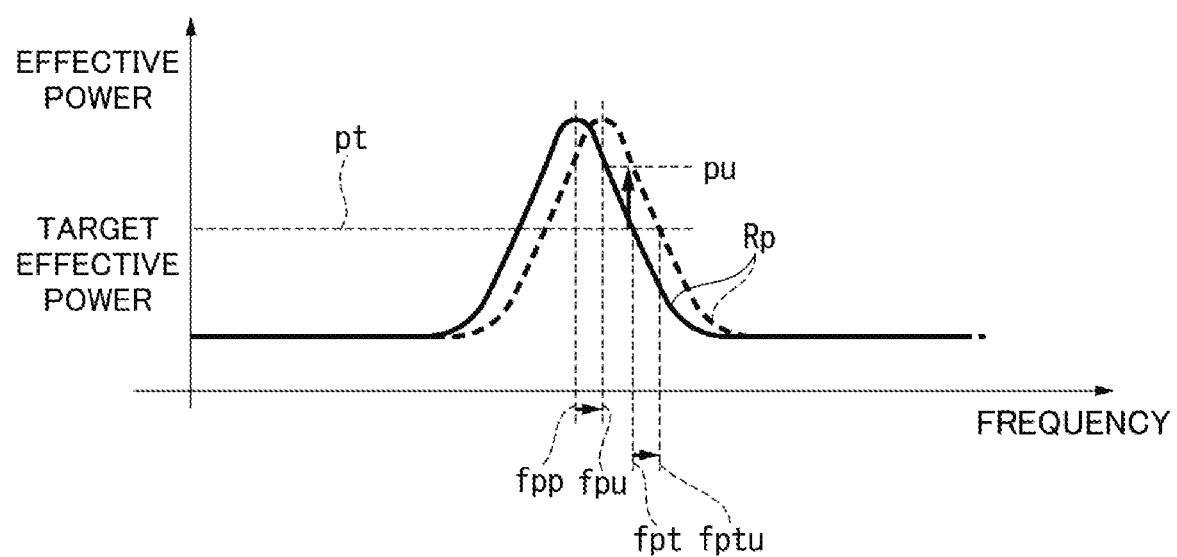
FIG. 13 is a graph showing an operation in the resonance lock in the second exemplary embodiment.

FIGS. 11 to 13 show a second exemplary embodiment of the invention.

In the second exemplary embodiment, the same variable focal length lens device 1 as that in the above-described first exemplary embodiment is used except that a different resonance-lock control is performed by the resonance-lock controller 611. Accordingly, the description of the same features is not made below, where the details of the resonance-lock control according to the second exemplary embodiment will be described.

As shown in FIG. 12, the resonance-lock controller 611 of the second exemplary embodiment is configured to set a target effective power pt at a predetermined value that is lower than the peak value pp of the detected effective power Rp of the lens system 3, and to tune the frequency of the drive signal Cf to a frequency fpt at which the target effective power pt is given. Then, while the lens system 3 is operated with the drive signal Cf of the frequency fpt, the resonance-lock controller 611 monitors the effective power Rp and determines, in response to a change in the effective power $R_p$, the direction of the change in the effective power Rp to raise or lower the frequency of the drive signal Cf.

Specifically, the resonance-lock controller 611 conducts the following procedures.

As shown in FIG. 11, the resonance-lock controller 611 performs the peak-scanning of the effective power Rp as an initial setting at the start of the resonance lock (Step S21).

As shown in FIG. 12, the drive signal Cf is inputted to the lens system 3 while raising the frequency of the drive signal Cf from a predetermined lower limit fmin to a predetermined upper limit fmax, and the effective power Rp consumed by the lens system 3 at each of the frequencies is registered in the peak-scanning.

Subsequently, the peak value pp of the scanned effective power Rp is referred to and the target effective power pt is set at a predetermined value lower than the peak value pp.

Then, the frequency fpt, at which the effective power Rp becomes the target effective power pt, is selected and set as the frequency of the drive signal Cf is tuned to the frequency fpt (Step S22 in FIG. 11).

The target effective power pt may be defined by a predetermined ratio (e.g. 70% of the peak value pp of the effective power Rp). Alternatively, the target effective power pt may be defined as a value smaller than the peak value pp by a predetermined value.

Though there are two points in the frequency of effective power Rp at which the target effective power pt is provided, the frequency fpt of higher one of the two points is selected in the second exemplary embodiment.

After the initial setting, the variable focal length lens device 1 is driven. Specifically, the resonance-lock controller 611 sends the drive signal Cf of the previously tuned frequency fpt to the lens system 3. Thus, the standing wave is created in the lens system 3 to turn the lens system 3 into an operation mode.

During the operation, the resonance-lock controller 611 acquires the effective power Rp at a predetermined cycle (Step S23) to monitor a change (decrease or increase) in the effective power Rp (Step S24).

In the absence of a change in the effective power Rp, it is determined that the resonance frequency fpt is not changed and the monitoring in Steps S23 and S24 is continued.

In contrast, when the effective power Rp changes, the resonance-lock controller 611 determines a direction of the change (i.e. decrease or increase) (Step S25). When the drive current Ri is decreased, the resonance frequency fpt is lowered (Step S26). When the drive current Ri is increased, the resonance frequency fpt is raised (Step S27).

As shown in FIG. 13, it is supposed that the resonance frequency of the lens system 3 rises from the frequency fpp (solid line) to a frequency fpu (dashed line) due to a temperature increase and the like. The target effective power of the original effective power Rp (solid line) at the resonance frequency fpt for the drive signal Cf is pt. However, the target effective power of the effective power Rp (dashed line) when the resonance frequency is raised increases to an effective power pu at the resonance frequency fpt.

The above change in the target effective power results in a determination in Step S25 in FIG. 11 that the effective power Rp has increased, and the resonance frequency fpt is raised to a resonance frequency fptu in Step S27.

When the resonance frequency of the lens system 3 decreases from the frequency fpp in contrast to that shown in FIG. 13, the effective power Rp represented in solid line in FIG. 13 shifts leftward in the figure, so that the value of the effective power Rp at the frequency fpt of the drive signal Cf decreases. Consequently, it is determined in Step S25 in FIG. 11 that the effective power Rp has decreased, and the resonance frequency fpt is lowered in Step S26.

As described above, the frequency of the drive signal Cf is raised when the resonance frequency of the lens system 3 is raised and the frequency of the drive signal Cf is lowered when the resonance frequency of the lens system 3 is lowered. Consequently, the frequency of the drive signal Cf is tuned to the resonance frequency of the lens system 3.

In the exemplary embodiment, the resonance-lock control of the drive signal Cf can be performed based solely on the effective power Rp of the lens system 3.

Specifically, the target effective power pt is set at a value lower than the peak value pp of the effective power Rp of the lens system 3. The value of the effective power Rp continuously decreases from the peak value pp along a positive or negative slope in the vicinity of the value of the target effective power pt. Accordingly, the direction for changing the frequency of the drive signal Cf can be determined by referring to the value of the effective power Rp in the vicinity of the frequency fpt at which the target effective power pt is given upon a change in the resonance frequency of the lens system 3 with respect to the frequency fpt of the drive signal Cf whose target effective power is set at pt.

Then, the lens system 3 can be stably operated at the resonance frequency by raising/lowering the frequency of the drive signal Cf based on the determined direction.

Further, the second exemplary embodiment, which is based solely on the effective power Rp of the lens system 3 in performing the resonance-lock control, may be implemented using a simplified structure and procedures.

Further, it is not necessary to refer to the drive current of the lens system 3 in the second exemplary embodiment. Thus, a failure in determining the change in the direction of the drive current, which results in a failure in the resonance-lock control by locking to the peak position, is less likely to occur, so that the resonance-lock control of the variable focal length lens device 1 can be stably performed.

Third Exemplary Embodiment

Figure 14:
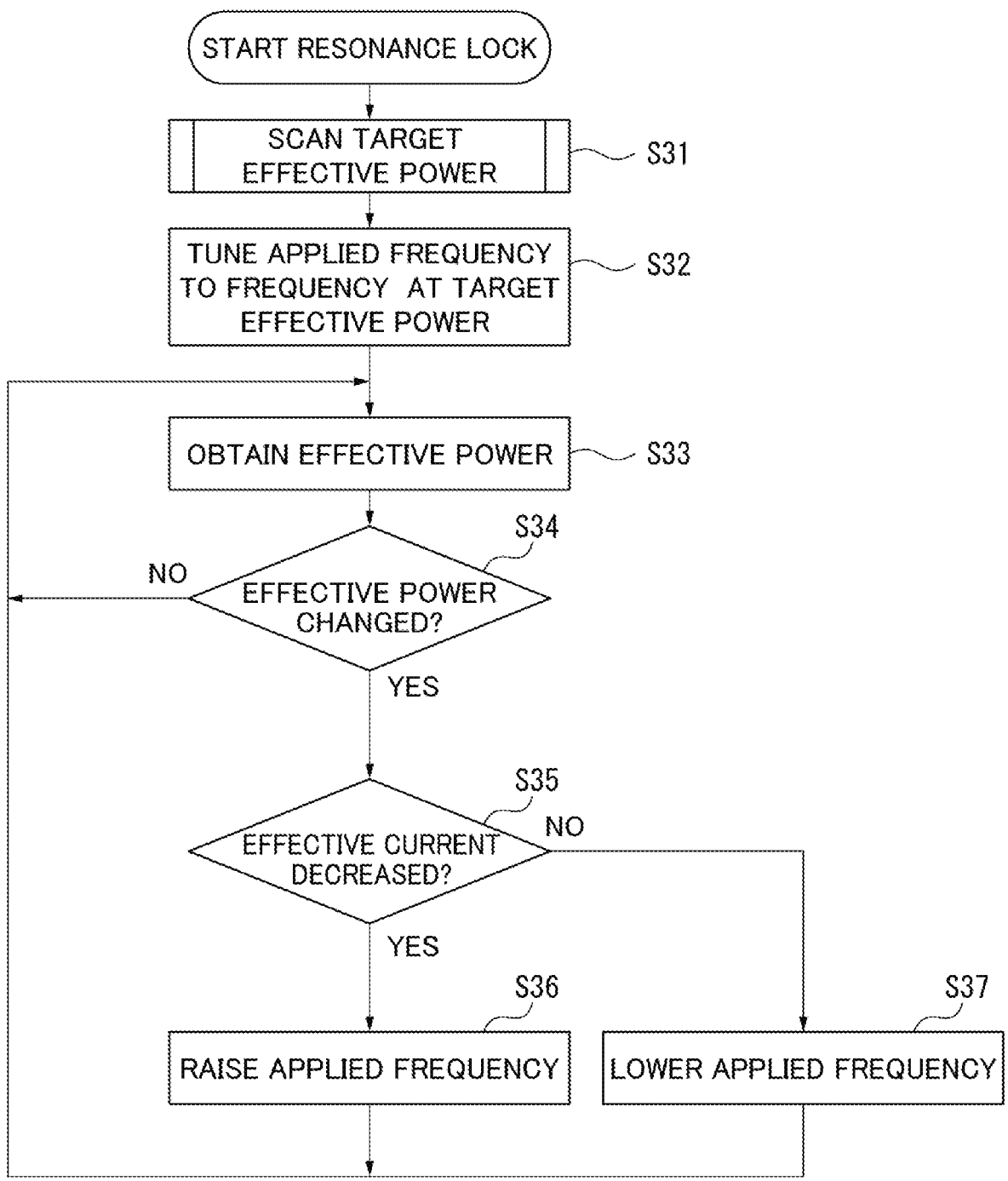
FIG. 14 is a flow chart showing procedures of a resonance lock in a third exemplary embodiment of the invention.
Figure 15:
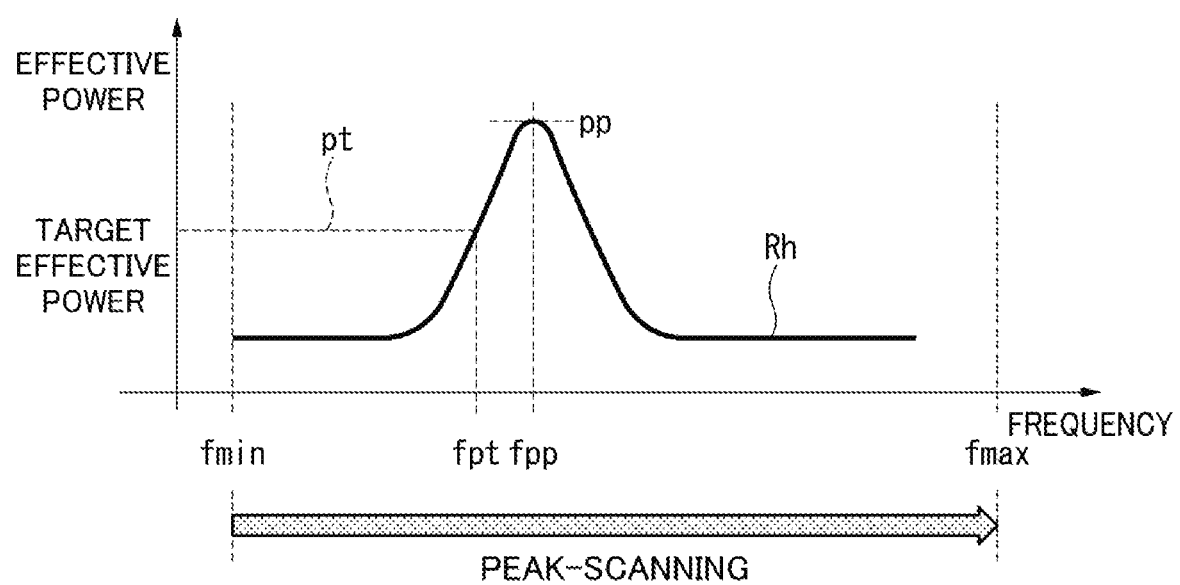
FIG. 15 is a graph showing a setting of the resonance lock in the third exemplary embodiment.
Figure 16:
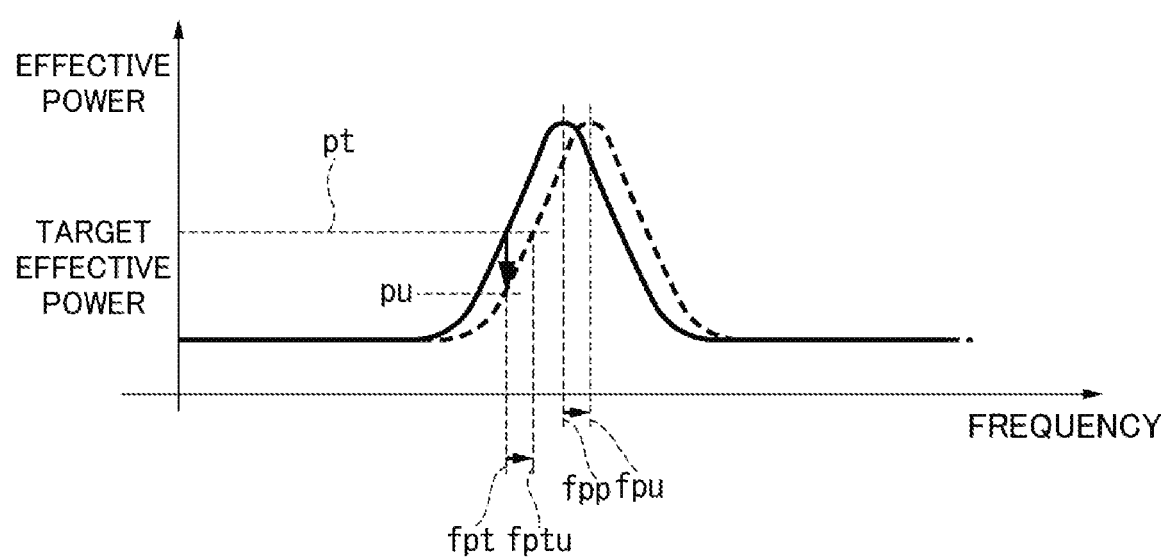
FIG. 16 is a graph showing an operation in the resonance lock in the third exemplary embodiment.

FIGS. 14 to 16 show a third exemplary embodiment of the invention.

In the third exemplary embodiment, the frequency fpt at which the target effective power pt is given is set at a frequency lower than the frequency fpp at which the peak value pp is given (see FIG. 15) instead of the frequency higher than the frequency fpp in the above-described second exemplary embodiment.

A part of the procedures (Steps S31 to S35) in the third exemplary embodiment is the same as Steps S21 to S25 in the above-described second exemplary embodiment. As a result of setting the frequency fpt at a frequency lower than the frequency fpp, the locking direction in Steps S36 and S37 is opposite to the direction in Steps S26 and S27 in the second exemplary embodiment.

As shown in FIG. 16, it is supposed that the resonance frequency of the lens system 3 rises from the frequency fpp (solid line) to a frequency fpu (dashed line) due to a temperature increase and the like. The target effective power of the original effective power Rp (solid line) at the resonance frequency fpt commanded by the drive signal Cf is pt. However, the target effective power of the effective power Rp (dashed line) when the resonance frequency is raised is lowered to an effective power pu at the resonance frequency fpt.

The above change in the target effective power results in a determination in Step S35 in FIG. 14 that the effective power Rp has decreased, and the resonance frequency fpt is raised to a resonance frequency fptu in Step S36.

When the resonance frequency of the lens system 3 decreases from the frequency fpp in contrast to that shown in FIG. 16, the effective power Rp represented in solid line in FIG. 16 shifts leftward in the figure, so that the value of the effective power at the resonance frequency fpt increases. Consequently, it is determined in Step S35 in FIG. 14 that the effective power Rp has increased, and the resonance frequency fpt is lowered in Step S37.

As described above, the frequency of the drive signal Cf is raised when the resonance frequency of the lens system 3 is raised and the frequency of the drive signal Cf is lowered when the resonance frequency of the lens system 3 is lowered. Consequently, the frequency of the drive signal Cf is locked to the resonance frequency of the lens system 3.

Thus, the same advantages as those in the above-described second exemplary embodiment can be achieved by the third exemplary embodiment.

Fourth Exemplary Embodiment

Figure 17:
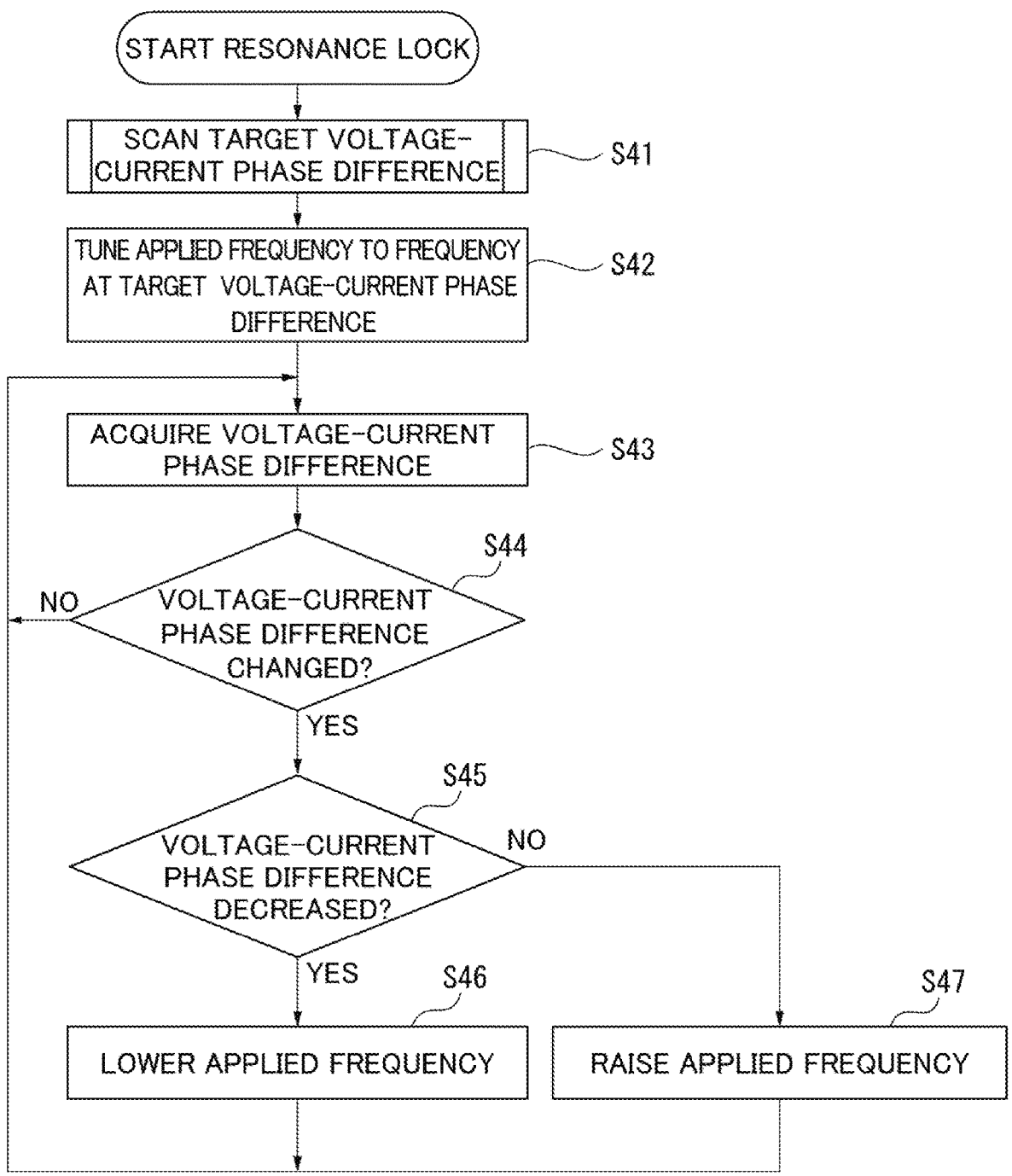
FIG. 17 is a flow chart showing procedures of a resonance lock in a fourth exemplary embodiment of the invention.
Figure 18:
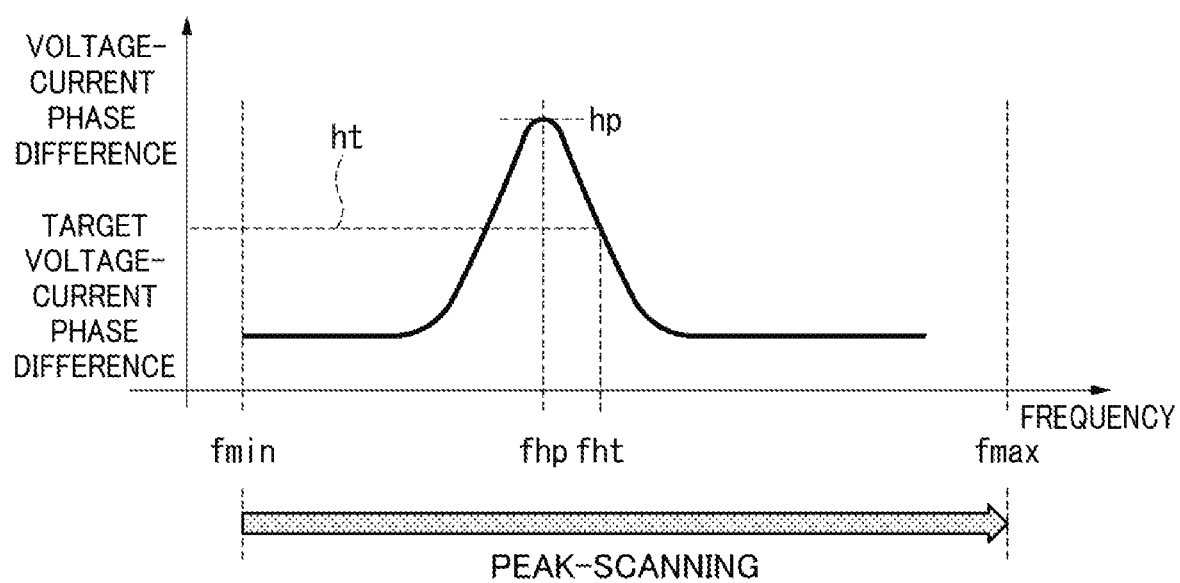
FIG. 18 is a graph showing a setting of the resonance lock in the fourth exemplary embodiment.
Figure 19:
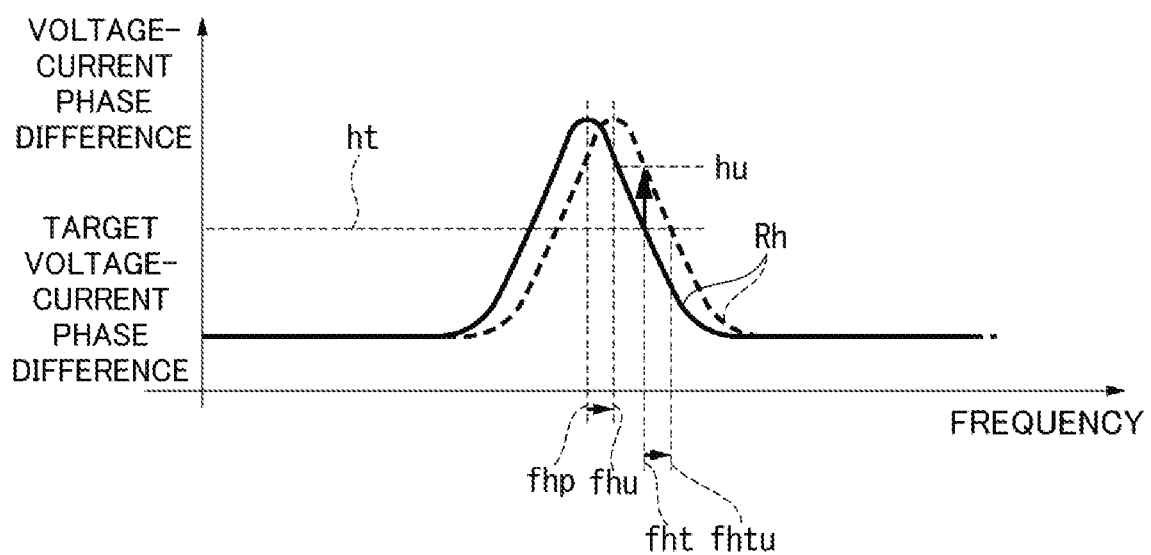
FIG. 19 is a graph showing an operation in the resonance lock in the fourth exemplary embodiment.
Figure 20:
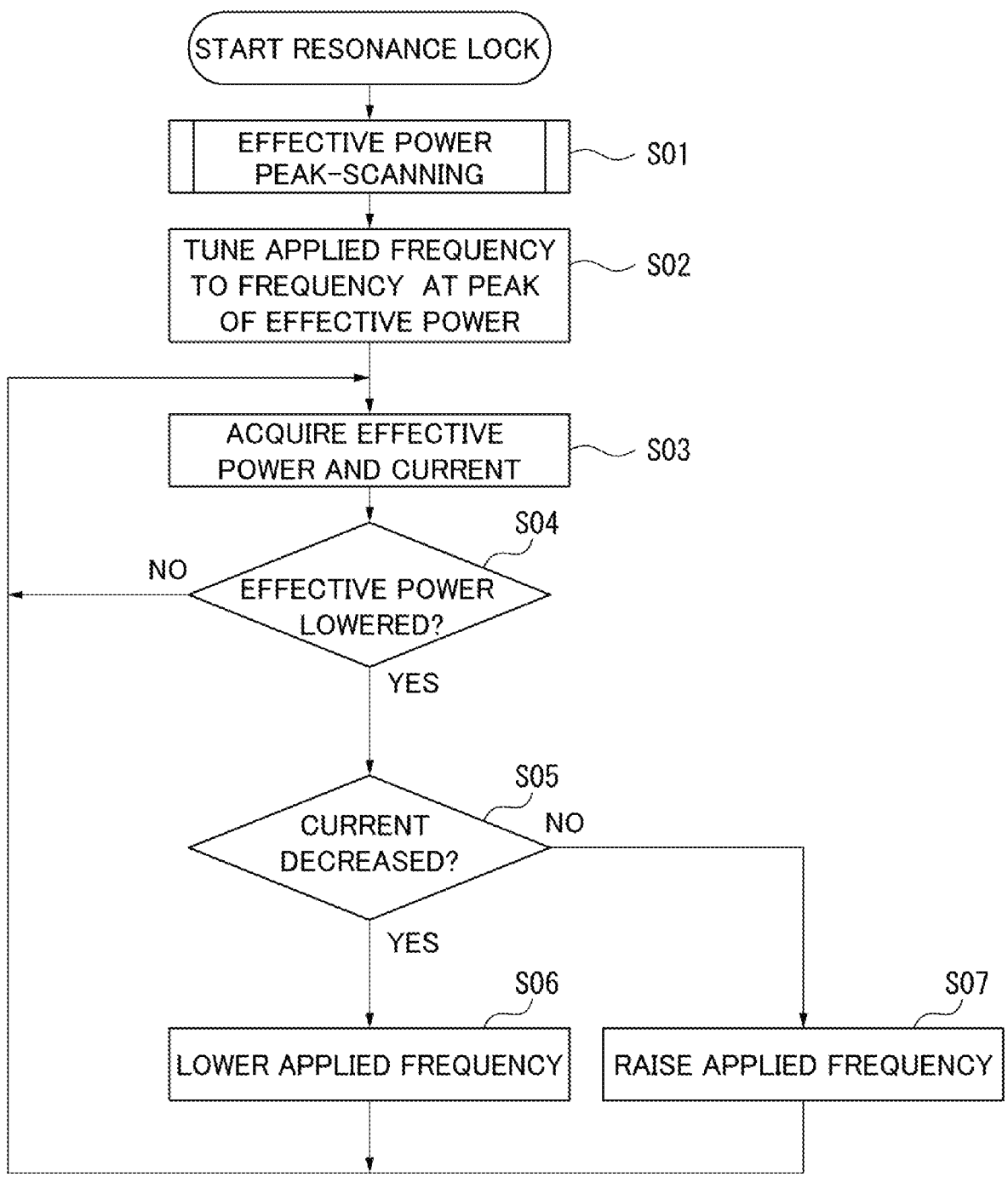
FIG. 20 is a flow chart showing procedures of a typical resonance lock.
Figure 21:
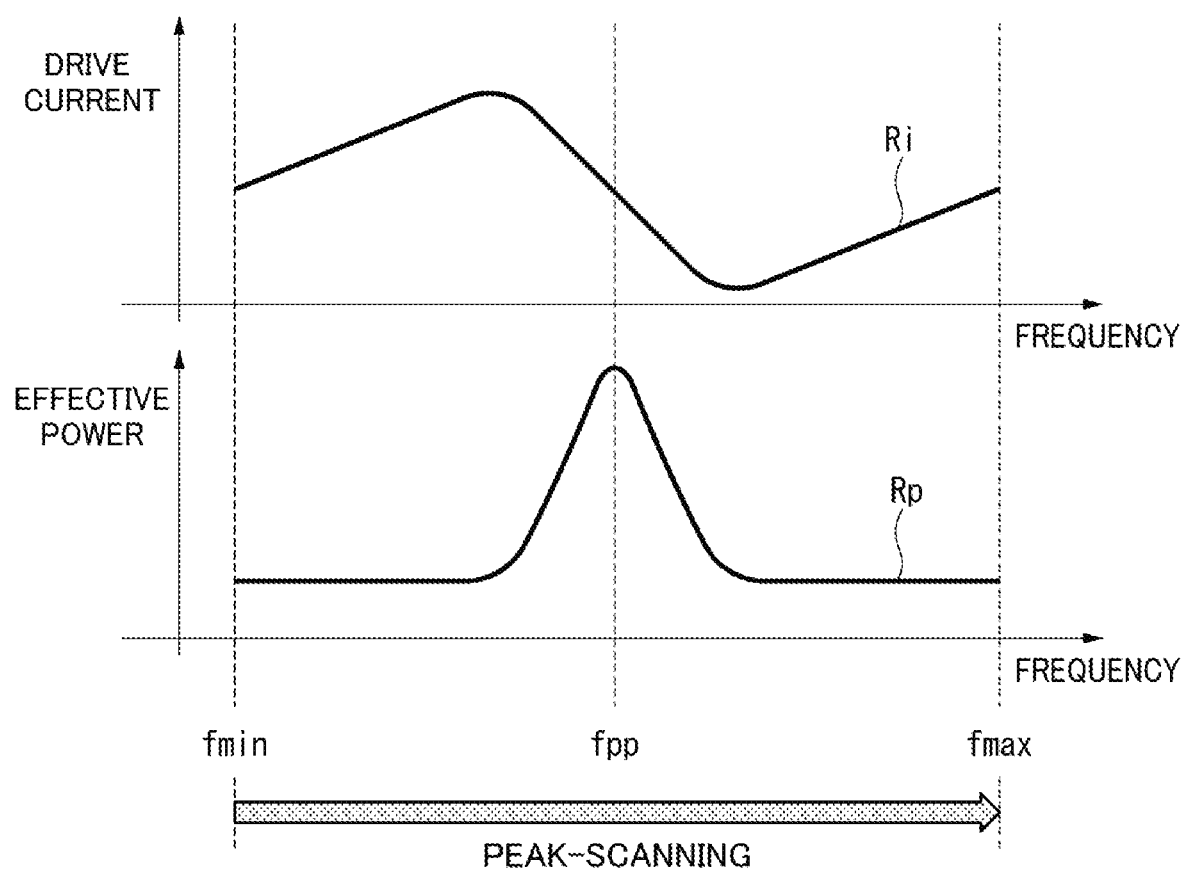
FIG. 21 shows graphs showing an outline of an operation in the typical resonance lock.
Figure 22:
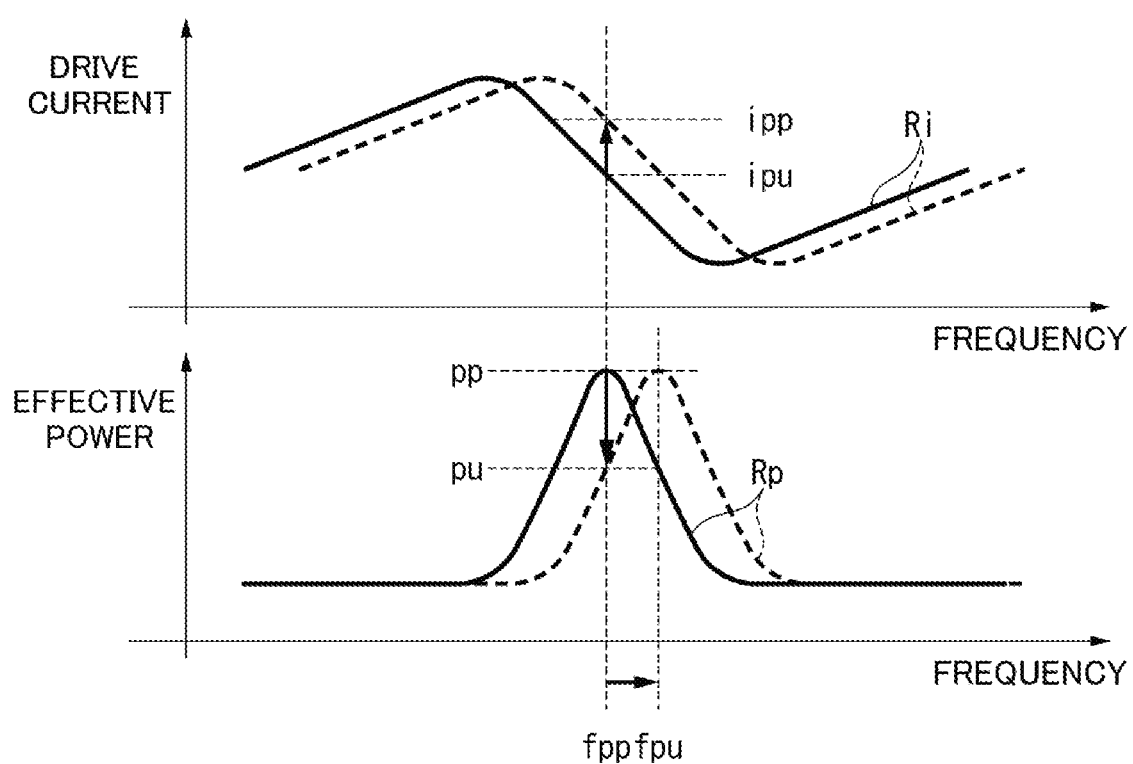
FIG. 22 shows graphs showing an effect of the typical resonance lock.
Figure 23:
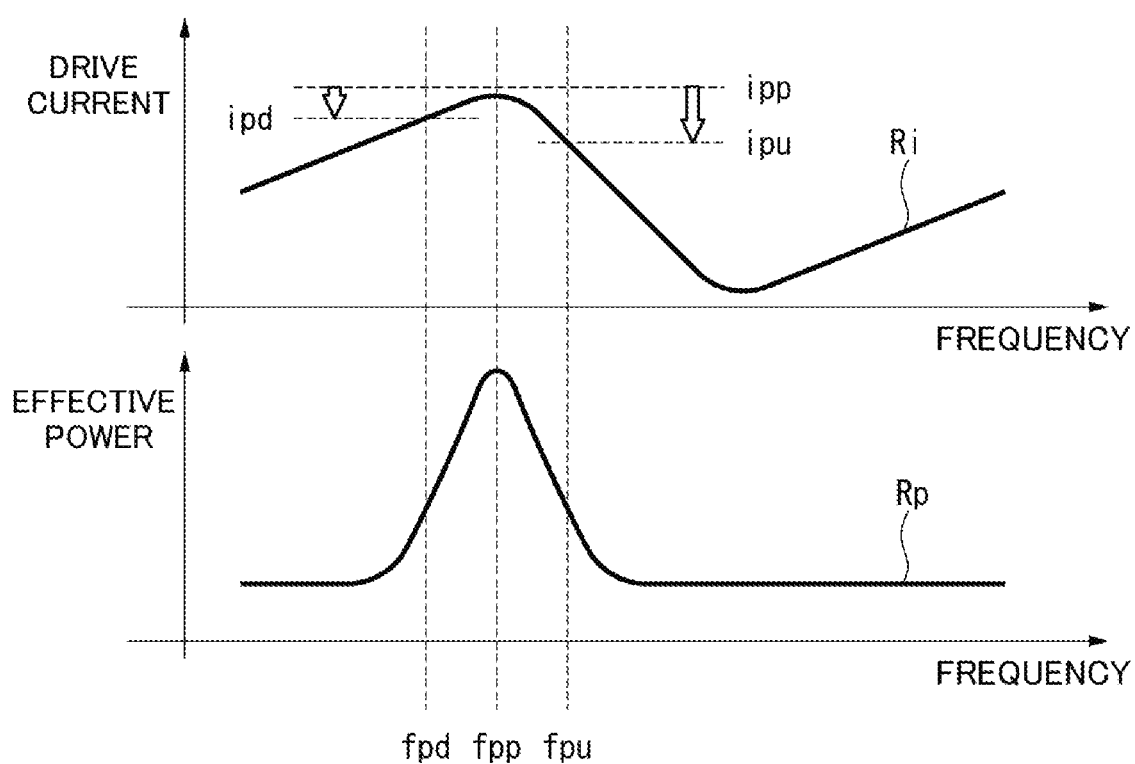
FIG. 23 shows graphs showing a disadvantage of the typical resonance lock.

FIGS. 17 to 19 show a fourth exemplary embodiment of the invention.

In the fourth exemplary embodiment, the same variable focal length lens device 1 as that in the above-described first exemplary embodiment is used except that a different resonance-lock control is performed by the resonance-lock controller 611. Accordingly, the description of the same features is not made below, where the details of the resonance-lock control according to the fourth exemplary embodiment will be described.

As shown in FIG. 18, the resonance-lock controller 611 of the fourth exemplary embodiment is configured to set a target voltage-current phase difference ht at a predetermined value that is lower than a peak value hp of the detected voltage-current phase difference Rh of the lens system 3, and to tune the frequency of the drive signal Cf to a frequency fht at which the target voltage-current phase difference ht is given. Then, while the lens system 3 is operated by the drive signal Cf of the frequency fht, the resonance-lock controller 611 monitors the voltage-current phase difference Rh. When a change in the voltage-current phase difference Rh is detected, the resonance-lock controller 611 determines the direction of the change in the voltage-current phase difference Rh and raises or lowers the frequency of the drive signal Cf.

Specifically, the resonance-lock controller 611 conducts the following procedures.

As shown in FIG. 17, the resonance-lock controller 611 performs the peak-scanning of the voltage-current phase difference Rh as an initial setting at the start of the resonance lock (Step S41).

As shown in FIG. 18, the drive signal Cf is inputted to the lens system 3 while the frequency of the drive signal Cf is raised from a predetermined lower limit fmin to a predetermined upper limit fmax, and the voltage-current phase difference Rh in the lens system 3 at each of the frequencies is registered in the peak-scanning.

The voltage-current phase difference Rh can be calculated based on a voltage waveform of the drive signal Cf and a waveform of the drive current Ri detected in the lens system 3.

Subsequently, a peak value hp of the scanned voltage-current phase difference Rh is referred to and the target voltage-current phase difference ht is set at a predetermined value lower than the peak value hp. Subsequently, a frequency fht, at which the scanned voltage-current phase difference Rh becomes the target voltage-current phase difference ht, is selected, and the frequency of the drive signal Cf is tuned to the frequency fht (Step S42 in FIG. 17).

The target voltage-current phase difference ht may be defined by, for instance, a predetermined ratio (e.g. 70% of the peak value hp of the voltage-current phase difference Rh). Alternatively, the target voltage-current phase difference ht may be defined as a value smaller than the peak value hp by a predetermined value.

Though there are two points in the frequency of the voltage-current phase difference Rh at which the target voltage-current phase difference ht is provided, the frequency fht at higher one of the two points is selected in the fourth exemplary embodiment.

After the initial setting, the variable focal length lens device 1 is driven. Specifically, the resonance-lock controller 611 sends the drive signal Cf of the previously tuned frequency fht to the lens system 3. Thus, the standing wave is created in the lens system 3 to turn the lens system into an operation mode.

During the operation, the resonance-lock controller 611 acquires the voltage-current phase difference Rh at a predetermined cycle (Step S43) to monitor a change (decrease or increase) in the voltage-current phase difference Rh (Step S44).

In the absence of the change in the voltage-current phase difference Rh, it is determined that the resonance frequency fht is not changed and the monitoring in Steps S43 and S44 is continued.

In contrast, when the voltage-current phase difference Rh changes, the resonance-lock controller 611 determines a direction of the change (i.e. decrease or increase) (Step S45). Upon a decrease in the voltage-current phase difference Rh, the resonance frequency fht is lowered (Step S46). Upon an increase in the voltage-current phase difference Rh, the resonance frequency fht is raised (Step S47).

As shown in FIG. 19, it is supposed that the resonance frequency of the lens system 3 rises from the frequency fhp (solid line) to a frequency fhu (dashed line) due to a temperature increase and the like. The target voltage-current phase difference of the original voltage-current phase difference Rh (solid line) at the resonance frequency fht for the drive signal Cf is ht. However, the target voltage-current phase difference of the voltage-current phase difference Rh (dashed line) when the resonance frequency is raised increases to a voltage-current phase difference hu at the resonance frequency fht.

In response to the change, it is determined in Step S45 in FIG. 17 that the voltage-current phase difference Rh has increased, and the frequency fht of the drive signal Cf is raised to fhtu in Step S47.

When the resonance frequency of the lens system 3 decreases from the frequency fhp in contrast to that shown in FIG. 19, the voltage-current phase difference Rh represented in solid line in FIG. 19 shifts leftward in the figure, so that the voltage-current phase difference Rh at the frequency fht of the drive signal Cf decreases. Consequently, it is determined in Step S45 in FIG. 17 that the value of the voltage-current phase difference Rh has decreased, and the frequency fht of the drive signal Cf is lowered in Step S46.

As described above, the frequency of the drive signal Cf is raised when the resonance frequency of the lens system 3 is raised and the frequency of the drive signal Cf is lowered when the resonance frequency of the lens system 3 is lowered. Consequently, the frequency of the drive signal Cf is locked to the resonance frequency of the lens system 3.

In the exemplary embodiment, the resonance-lock control of the drive signal Cf can be performed based solely on the voltage-current phase difference Rh of the lens system 3.

In other words, the target voltage-current phase difference ht is set at a value lower than the peak value pp of the voltage-current phase difference Rh of the lens system 3. The value of the voltage-current phase difference Rh continuously decreases from the peak value hp along a positive or negative slope in the vicinity of the value of the target voltage-current phase difference ht. Accordingly, the direction for changing the frequency of the drive signal Cf can be determined by referring to the value of the voltage-current phase difference Rh in the vicinity of the frequency fht at which the target voltage-current phase difference ht is given upon a change in the resonance frequency of the lens system 3 with respect to the frequency fht of the drive signal Cf whose target voltage-current phase difference is set at ht.

The lens system 3 can be stably operated at the resonance frequency by raising/lowering the frequency of the drive signal Cf based on the determined direction.

Further, the fourth exemplary embodiment, which is based solely on the voltage-current phase difference Rh of the lens system 3 in performing the resonance-lock control, may be implemented using a simplified structure and procedures.

Further, it is not necessary to examine the drive current of the lens system 3 in the fourth exemplary embodiment. Thus, a failure in determining the change in the direction of the drive current, which results in a failure in the resonance-lock control by locking to the peak position, is less likely to occur, so that the resonance-lock control of the variable focal length lens device 1 can be stably performed.

It should be noted that, though the frequency fht at which the target voltage-current phase difference ht is given is set at the frequency higher than the frequency fhp at which the voltage-current phase difference Rh becomes the peak value hp in the above-described fourth exemplary embodiment, the frequency fht may be set lower than the frequency fhp in the same manner as in the above-described third exemplary embodiment with respect to the second exemplary embodiment.

Modification(s)

It should be understood that the scope of the present invention is not limited to the above-described exemplary embodiment(s) but includes modifications and the like as long as the modifications and the like are compatible with the invention.

The lens controller 6 and the controller PC 7, which are used in combination in order to drive and control the lens system 3 in the above exemplary embodiments, may alternatively be an integrated device configured to start, control and operate the lens system 3. However, it should be noted that the combination of the lens controller 6 and the controller PC 7 as in the above exemplary embodiments can provide an independent hardware necessary for starting and controlling the lens system 3. Further, the operation and configuration of the setting of the lens controller 6 and also image capturing can be achieved using a versatile personal computer.

Though the drive signal Cf and the focus-position-variation waveform Mf are sinusoidal in the exemplary embodiments, the drive signal Cf and the focus-position-variation waveform Mf may alternatively have other waveform such as triangular waveform, saw-tooth waveform, rectangular waveform or the like.

The specific structure of the lens system 3 may be altered as necessary. For instance, the case 31 and the oscillator 32 are not necessarily cylindrical but may be hexagonal, and the dimension of the case 31 and the oscillator 32 and the nature of the liquid 35 may be altered as desired.

What is claimed is:

1. A variable focal length lens device comprising:
    a lens system whose refractive index changes in accordance with an inputted drive signal; and
    a resonance-lock controller configured to lock the drive signal to a variable and temperature-dependent resonance frequency of the lens system, wherein
    the resonance-lock controller is configured to tune a frequency of the drive signal to a peak position of a voltage-current phase difference between a voltage of the drive signal and a drive current of the lens system, and to raise or lower the frequency of the drive signal based on the drive current when the voltage-current phase difference is changed.

2. A variable focal length lens device comprising:
    a lens system whose refractive index changes in accordance with an inputted drive signal; and
    a resonance-lock controller configured to lock the drive signal to a variable and temperature-dependent resonance frequency of the lens system, wherein
    the resonance-lock controller is configured to set a target effective power that is lower than a peak value of an effective power of the lens system, to tune a frequency of the drive signal to a frequency at which the target effective power is provided, and to raise or lower the frequency of the drive signal in accordance with an increase or decrease in the effective power when the effective power is changed.

3. A variable focal length lens device comprising:
    a lens system whose refractive index changes in accordance with an inputted drive signal; and
    a resonance-lock controller configured to lock the drive signal to a variable and temperature-dependent resonance frequency of the lens system, wherein
    the resonance-lock controller is configured to set a target voltage-current phase difference that is lower than a peak value of a voltage-current phase difference between a voltage of the drive signal and a drive current of the lens system, to tune a frequency of the drive signal to a frequency at which the target voltage-current phase difference is provided, and to raise or lower the frequency of the drive signal in accordance with an increase or decrease in the voltage-current phase difference when the voltage-current phase difference is changed.

4. A method of controlling a variable focal length lens device comprising: a lens system whose refractive index changes in accordance with an inputted drive signal; and a resonance-lock controller configured to lock the drive signal to a variable and temperature-dependent resonance frequency of the lens system, the method comprising:
    tuning a frequency of the drive signal to a peak position of a voltage-current phase difference between a voltage of the drive signal and a drive current of the lens system; and
    raising or lowering the frequency of the drive signal in accordance with the drive current when the voltage-current phase difference is changed.

5. A method of controlling a variable focal length lens device comprising: a lens system whose refractive index changes in accordance with an inputted drive signal; and a resonance-lock controller configured to lock the drive signal to a variable and temperature-dependent resonance frequency of the lens system, the method comprising:
    setting a target effective power that is lower than a peak value of an effective power of the lens system;
    tuning a frequency of the drive signal to a frequency at which the target effective power is provided; and
    raising or lowering the frequency of the drive signal in accordance with an increase or decrease in the effective power when the effective power is changed.

6. A method of controlling a variable focal length lens device comprising: a lens system whose refractive index changes in accordance with an inputted drive signal; and a resonance-lock controller configured to lock the drive signal to a variable and temperature-dependent resonance frequency of the lens system, the method comprising:

setting a target voltage-current phase difference that is lower than a peak value of a voltage-current phase difference between a voltage of the drive signal and a drive current of the lens system;

tuning a frequency of the drive signal to a frequency at which the target voltage-current phase difference is provided; and raising or lowering the frequency of the drive signal based on an increase or decrease in the voltage-current phase difference when the voltage-current phase difference is changed.

7. The variable focal length lens device according to claim 1, wherein the drive signal is at least one of a sinusoidal, triangular, saw-tooth, and rectangular waveform.

8. The variable focal length lens device according to claim 2, wherein the drive signal is at least one of a sinusoidal, triangular, saw-tooth, and rectangular waveform.

9. The variable focal length lens device according to claim 3, wherein the drive signal is at least one of a sinusoidal, triangular, saw-tooth, and rectangular waveform.

10. The method of controlling a variable focal length lens device according to claim 4, wherein the drive signal is at least one of a sinusoidal, triangular, saw-tooth, and rectangular waveform.

11. The method of controlling a variable focal length lens device according to claim 5, wherein the drive signal is at least one of a sinusoidal, triangular, saw-tooth, and rectangular waveform.

12. The method of controlling a variable focal length lens device according to claim 6, wherein the drive signal is at least one of a sinusoidal, triangular, saw-tooth, and rectangular waveform.

\* \* \* \* \*